United States Patent
Miyazaki et al.

(10) Patent No.: US 8,608,563 B2
(45) Date of Patent: Dec. 17, 2013

(54) METHOD FOR EXCHANGING NPC DATA BETWEEN COMPUTER DEVICES

(75) Inventors: Hidetaka Miyazaki, Tokyo (JP); Daisuke Uchiyama, Tokyo (JP)

(73) Assignee: Namco Bandai Games Inc., Tokyo (JP)

( * ) Notice: Subject to any disclaimer, the term of this patent is extended or adjusted under 35 U.S.C. 154(b) by 0 days.

(21) Appl. No.: 13/610,413

(22) Filed: Sep. 11, 2012

(65) Prior Publication Data

US 2013/0072296 A1  Mar. 21, 2013

(30) Foreign Application Priority Data

Sep. 14, 2011 (JP) .................................. 2011-200793

(51) Int. Cl.
G06F 17/00 (2006.01)
(52) U.S. Cl.
USPC ............................................................ 463/31
(58) Field of Classification Search
USPC ................................................ 463/31–37, 42
See application file for complete search history.

(56) References Cited

U.S. PATENT DOCUMENTS

| | | |
|---|---|---|
| 7,491,124 B2 | 2/2009 | Tanaka et al. |
| 2008/0146333 A1* | 6/2008 | Kando et al. .................... 463/33 |
| 2009/0124393 A1 | 5/2009 | Tanaka et al. |
| 2011/0190063 A1* | 8/2011 | Kajii ............................... 463/42 |
| 2012/0004017 A1* | 1/2012 | Sakurai et al. .................... 463/2 |
| 2012/0190444 A1* | 7/2012 | Fujisawa et al. ................ 463/31 |
| 2012/0302352 A1* | 11/2012 | Ajami et al. .................... 463/42 |

FOREIGN PATENT DOCUMENTS

| | | |
|---|---|---|
| JP | B2-4073885 | 4/2008 |
| JP | A-2010-88694 | 4/2010 |

\* cited by examiner

*Primary Examiner* — Ronald Laneau
(74) *Attorney, Agent, or Firm* — Oliff & Berridge, PLC

(57) ABSTRACT

A special enemy character appears in a game world when a given appearance condition has been satisfied in a node (game device). When a game status relating to the special enemy character has satisfied a given game world-to-game world transfer condition (e.g., when the special enemy character has been severely damaged), the node transmits current character data of the special enemy character to another node (another game device), and deletes the special enemy character from the game world. When the appearance condition has been satisfied in the other node, the special enemy character appears in the game world generated by the other node while maintaining the state before transfer.

11 Claims, 23 Drawing Sheets

(1) APPEARANCE (2) BATTLE (3) GAME WORLD-TO-GAME WORLD TRANSFER CONDITION HAS BEEN SATISFIED (4) GAME WORLD-TO-GAME WORLD TRANSFER

FIG. 12

| | BENEFIT-GIVING LIST | | | |
|---|---|---|---|---|
| | ADDRESS INFORMATION | IP08, PORT08 | IP33, PORT33 | ... |
| | BENEFIT | HP+10 | EXPERIENCE VALUE +30 | ... |
| | TIME LIMIT | DATE/TIME 08 | DATE/TIME 33 | ... |

590 — BENEFIT-GIVING LIST
592 — ADDRESS INFORMATION
594 — BENEFIT
596 — TIME LIMIT

METHOD FOR EXCHANGING NPC DATA BETWEEN COMPUTER DEVICES

Japanese Patent Application No. 2011-200793 filed on Sep. 14, 2011, is hereby incorporated by reference in its entirety.

BACKGROUND

A method that improves the game playability (i.e., adds interest to the game) by exchanging game data between game devices has been known. For example, Japanese Patent No. 4073885 discloses technology that enables automatic game data exchange by allowing the players to provide exchange target game data in advance. JP-A-2010-88694 discloses technology that allows a player who desires to play the game with another player to select a multi-player mode in advance, transmits a multi-player play request in the selected mode to another player who plays the same game via a game server, and implements multi-player play in the selected mode when the other player has agreed to participate in multi-player play.

An item that can be used by a character or a player character used for multi-player play has been normally exchanged between game devices as the game data.

SUMMARY

According to one aspect of the invention, there is provided a method comprising:

receiving a non-playable character (NPC) data from a first different computer;

displaying an NPC using the NPC data;

controlling a battle with the NPC based on an operation input;

rewriting the NPC data corresponding to the battle; and transmitting the NPC data that has been rewritten to a second different computer, at least one of the receiving, the displaying, the controlling, and the transmitting being performed by a hardware processor.

According to another aspect of the invention, there is provided a computer device comprising:

a reception control section that receives a non-playable character (NPC) data from a first different computer;

a display control section that displays an NPC using the NPC data;

a battle control section that controls a battle with the NPC based on an operation input;

a data update section that rewrites the NPC data corresponding to the battle; and a transmission control section that transmits the NPC data that has been rewritten to a second different computer.

BRIEF DESCRIPTION OF THE DRAWINGS

FIG. 12 is a view illustrating a data configuration example of benefit-giving list.

DESCRIPTION OF EXEMPLARY EMBODIMENTS

Figure 1:
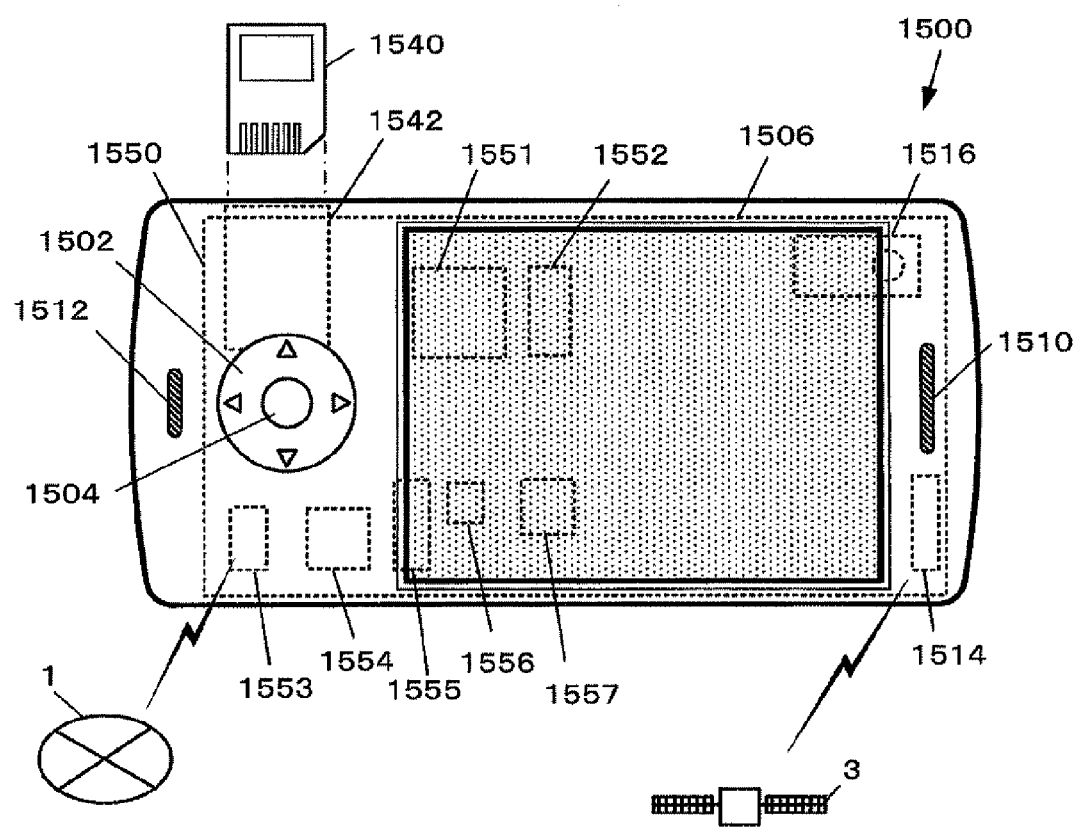
FIG. 1 is a view illustrating the appearance of a game device.
Figure 1:
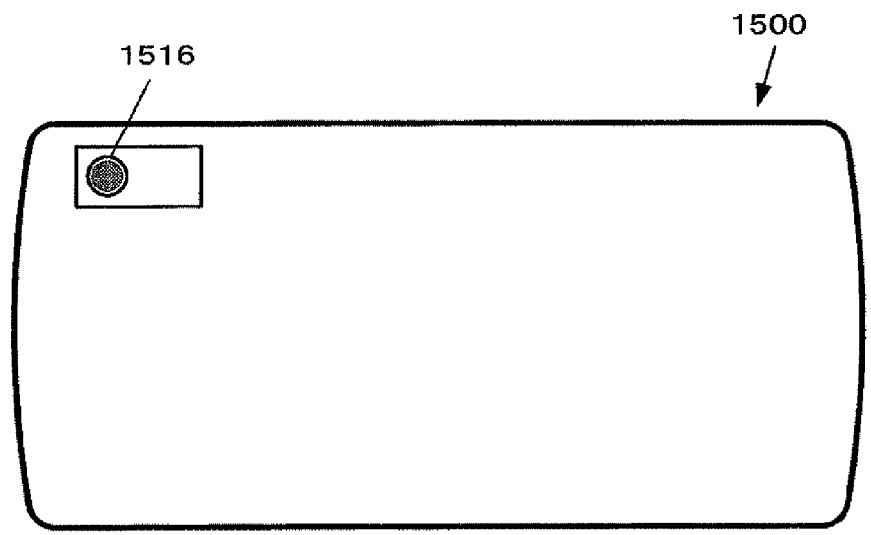

Several embodiments of the invention make it possible to improve the game playability (i.e., add interest to the game) by utilizing an exchange of NPC game data between computer devices.

According to one embodiment of the invention, there is provided a method comprising:

receiving a non-playable character (NPC) data from a first different computer;

displaying an NPC using the NPC data;

controlling a battle with the NPC based on an operation input;

rewriting the NPC data corresponding to the battle; and transmitting the NPC data that has been rewritten to a second different computer, at least one of the receiving, the displaying, the controlling, and the transmitting being performed by a hardware processor.

According to another embodiment of the invention, there is provided a computer device comprising:

a reception control section that receives a non-playable character (NPC) data from a first different computer;

a display control section that displays an NPC using the NPC data;

a battle control section that controls a battle with the NPC based on an operation input;

a data update section that rewrites the NPC data corresponding to the battle; and a transmission control section that transmits the NPC data that has been rewritten to a second different computer.

The above configuration makes it possible to implement an NPC that moves from computer to computer that executes an identical game while maintaining its state. More specifically, when the state of the NPC has changed in one computer due to interaction with a player character or the like, the NPC moves to another computer while maintaining its state, and interacts with a player character or the like in the other computer. This makes it possible to improve the game playability by utilizing an exchange of NPC game data between computer devices.

The method may further comprise:

determining whether or not a result of the battle has satisfied a transfer condition that is specified as a condition whereby the NPC moves, and the transmitting may include transmitting the NPC data to the second different computer when the result of the battle has satisfied the transfer condition.

This makes it possible to set the condition whereby the NPC moves,

The method may further comprise:

causing the NPC to appear in a game world when a game status has satisfied an appearance condition that is specified as a condition whereby the NPC appears.

This makes it possible to set the condition whereby the NPC appears in the game world.

The method may further comprise:

transmitting the NPC data received from the first different computer to the second different computer without rewriting the NPC data when a state in which the appearance condition is not satisfied has continued for a given time.

This makes it possible to prevent a situation in which the NPC is retained in a specific computer for a long time.

The method may further comprise:

communicating with a plurality of different computers, and selecting one of the plurality of different computers that satisfies a given game status similarity condition with a player's computer as the second different computer.

This makes it possible to move the NPC to a computer that is generating a similar game status.

The method may further comprise:

receiving clone data of the NPC data that is linked to a time limit from a third different computer, and the displaying may include causing the NPC to appear based on the clone data when the NPC data has not been received from the first different computer before the time limit linked to the clone data is reached.

This makes it possible to restore the NPC even if a computer to which the NPC has moved is not continuously used.

The method may further comprise:

receiving the NPC data from the first different computer after causing the NPC to appear based on the clone data, and not displaying the NPC based on the NPC data received from the first different computer when the NPC data received from the first different computer is identical with the clone data.

A situation in which a plurality of identical characters are displayed can be prevented by not displaying an NPC that is identical with the restored NPC and has moved to the computer after the restored NPC.

The method may further comprise:

generating clone data based on the NPC data, the clone data being data of a clone character of the NPC; and transmitting the clone data that is linked to time limit information to a third different computer.

This makes it possible to set a time limit to the clone data.

In the method, the NPC data may include battle player historical information that identifies a computer of a player who has battled against the NPC, and the method may further comprise performing a given benefit-giving process when a result of the battle has satisfied a given benefit-giving condition, and transmitting a signal to the computer of the player who has battled against the NPC based on the battle player historical information, the signal prompting the computer of the player who has battled against the NPC to perform the benefit-giving process.

This makes it possible to give benefit to each player who has battled against the NPC when the result of the battle with the NPC has satisfied the given benefit-giving condition.

In the method, the NPC data may include transfer upper limit data that indicates an upper limit of a number of transfers between computers, and the method may further comprise rewriting the transfer upper limit data corresponding to a result of the battle.

This makes it possible to limit the transfer of the NPC, and change the limit corresponding to the result of the battle.

In the method, the NPC data may include appearance data of the NPC, and the method may further comprise rewriting the appearance data corresponding to the battle.

This makes it possible to visually express the NPC transfer history.

In the method, the NPC data may include attack capability data that indicates an attack capability of the NPC, and the method may further comprise rewriting the attack capability data corresponding to the battle.

This makes it possible to change the action pattern of the NPC (e.g., causes the NPC to become more violent or less violent) corresponding to the transfer history.

According to another embodiment of the invention, there is provided a non-transitory computer-readable storage medium storing a program that causes a computer device to execute the above method.

The term "storage medium" used herein refers to a magnetic disk, an optical disk, an IC memory, and the like.

First Embodiment

A first embodiment of the invention is described below taking an example in which an online single-player role-playing game (RPG) is executed using computers that are connected via a peer-to-peer (P2P) network.

FIG. 1 is a view (front external view (1) and rear external view (2)) illustrating a configuration example of a game device 1500 (i.e., computer) that is used to play the game according to the first embodiment.

The game device 1500 according to the first embodiment includes an arrow key 1502, a home key 1504, a touch panel 1506, a speaker 1510, a microphone 1512, a Global Positioning System (GPS) antenna 1514, a CCD camera module 1516, a control board 1550, and a memory card reader 1542 that reads and writes data from and into a memory card 1540 (i.e., computer-readable storage medium). The game device 1500 also includes a built-in battery, a power button, a volume control button, and the like (not illustrated in FIG. 1).

The CCD camera module 1516 includes an autofocus mechanism, a CCD image sensor, and an image signal generation chip, and is disposed so that the rear side of the game device 1500 can be captured (photographed). Note that the image sensor is not limited to a CCD image sensor, but may be a CMOS image sensor or the like.

The control board 1550 includes a microprocessor (e.g., central processing unit (CPU) 1551, graphics processing unit (GPU), and digital signal processor (DSP)), an application-specific integrated circuit (ASIC), and an IC memory 1552 (e.g., VRAM, RAM, and ROM).

The control board 1550 also includes a wireless communication module 1553 for connecting to a wireless base station (e.g., mobile phone base station or wireless LAN base station) via wireless communication, an electronic compass 1555, a triaxial gyroscope 1556, and a triaxial acceleration sensor 1557.

The control board 1550 further includes interface (I/F) circuits such as a driver circuit that drives the touch panel 1506, a circuit that receives signals from the arrow key 1502 and the home key 1504, an output amplifier circuit that outputs a sound signal to the speaker 1510, an input signal generation circuit that generates a signal of voice input through the microphone 1512, and a signal input-output circuit that inputs and outputs a signal to and from the memory card reader 1542. The elements included in (mounted on) the control board 1550 are electrically connected via a bus circuit or the like so that the elements can exchange data and signals.

The GPS module 1554 and the GPS antenna 1514 function as a means that acquires position information by utilizing the GPS. The GPS module 1554 outputs the position information (e.g., latitude and longitude) and additional information (absolute time) every given time (e.g., every second) as data that can be processed by the control board 1550 based on a signal that is output from a GPS satellite 3 and received by the GPS antenna 1514. Note that the positioning system is not limited to the GPS. A satellite positioning system other than the GPS, or a positioning system that does not utilize a satellite may also be used as the positioning system. When using a positioning system that does not utilize a satellite, the wireless communication module 1553 may acquire the position information that is set in advance to the wireless base station from the wireless base station, or may calculate the position information by a triangulation method that utilizes the time difference of arrival from three wireless base stations.

The control board 1550 reads a game program and data necessary for executing the game from the memory card 1540, and temporarily stores the game program and the data in the IC memory 1552. The control board 1550 executes the game program to perform a calculation process, and controls each section of the game device 1500 based on an operation input performed using the arrow key 1502, the home key 1504, and the touch panel 1506 to implement a video game. Note that the game device 1500 may download the necessary program and the setting data from a server or the like via the communication channel 1 instead of reading the necessary program and the setting data from the memory card 1540.

Note that the term "game device" used herein may be interpreted as "computer". An individual game device 1500 may be identified by assigning a lower-case letter at the end of the reference sign (e.g., game device 1500a or 1500b).

Figure 2:
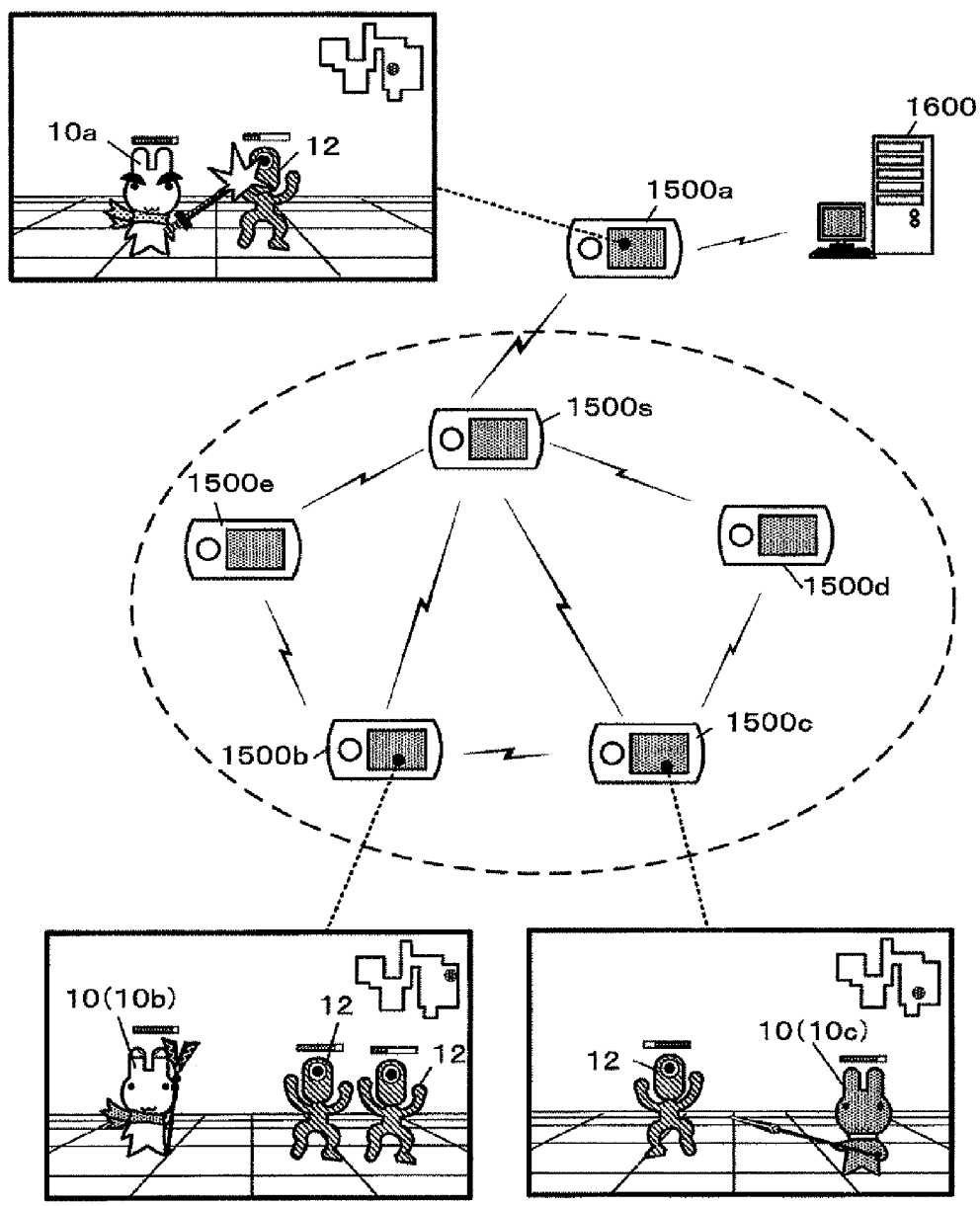
FIG. 2 is a view illustrating a network configuration example and a game screen example during game play.

As illustrated in FIG. 2, a game device 1500a connects to a given client server 1600 via the Internet, and requests user registration and login authentication. When the game device 1500a has logged into the client server 1600, the game device 1500a acquires super-node index information from the client server 1600, connects to a super-node game device 1500s, and participates in a P2P network that connects game devices 1500b, 1500c, . . . of other players who play the same game.

Outline of Game

An outline of the game according to the first embodiment is described below.

The game according to the first embodiment is a 3D computer graphics (3DCG) game that is designed so that a background object is disposed in a virtual three-dimensional space to form a game space, a player character 10 (10a, 10b, or 10c) and an enemy character 12 are disposed in the game space, and a CG (computer graphics) image is generated by capturing (photographing) the game space using a virtual camera to generate a game screen (image) (see FIG. 2).

Each game device (1500b, 1500c, . . . ) independently generates the game space in the virtual three-dimensional space. The game space generated by each game device has an identical configuration (i.e., the game world generated by each game device has an identical structure), but each player plays the game in a different world. More specifically, the game worlds generated by the game devices 1500b, 1500c, . . . are referred to as "parallel worlds". Since each game world is basically generated independently of one another, each player character 10 (10a, 10b, or 10c) generated by each game device (1500a, 1500b, or 1500c) is present on the same map in each game world, but does not encounter the player character of another player. Note that the game may be designed so that the player character of each player can encounter the player character of another player. The following description is given on the assumption that the player character of each player does not encounter the player character of another player. Since the enemy character 12 is independently and automatically controlled in each game world, the game status differs between the game devices 1500a, 1500b, and 1500c.

Figure 3:
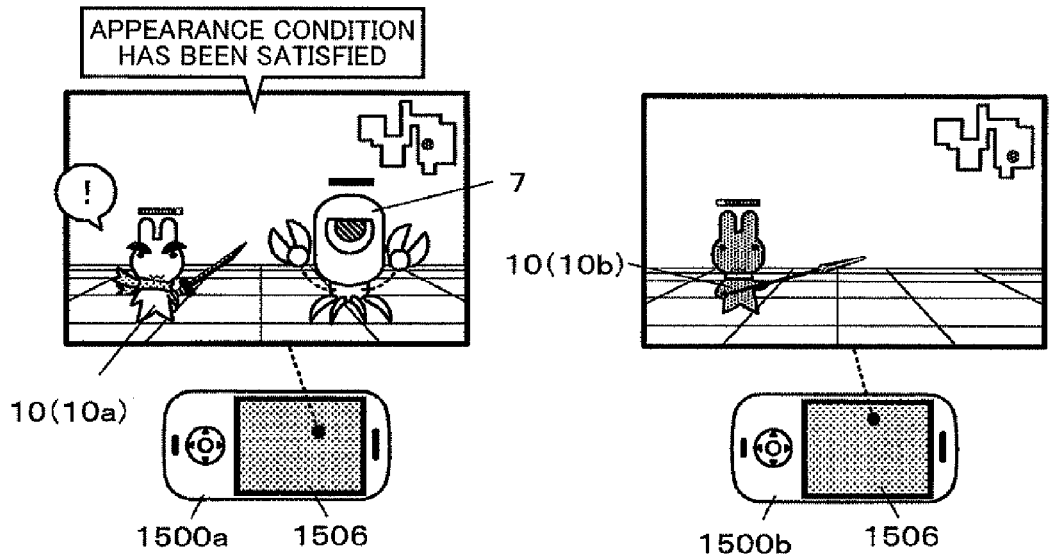
FIG. 3 is a schematic view illustrating the principle of the movement of an NPC from game world to game world.
Figure 3:
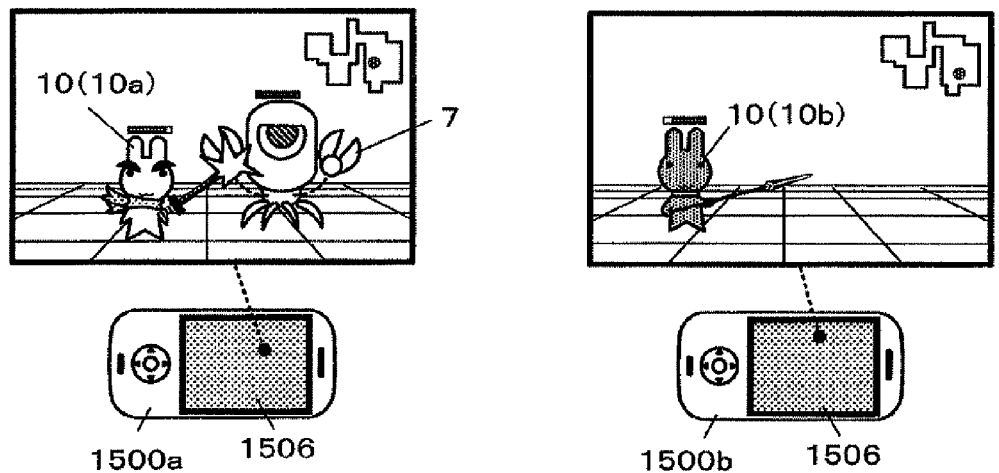

As illustrated in FIG. 3, a special enemy character 7 appears in the game world so that the special enemy character 7 can move from game world to game world. The special enemy character 7 is set to the game map in advance, and automatically appears when the game status has satisfied a given appearance condition ((1) in FIG. 3), or the special enemy character 7 appears when the super-node 1500s has transmitted first character data of the special enemy character 7 to another node (1500a, 1500b, . . . ) in a given cycle, and the game status has satisfied the given appearance condition in the node (game device 1500) that has received the first character data. The special enemy character 7 that has appeared in the game world battles against the player character 10 ((2) in FIG. 3).

The appearance condition may be appropriately set depending on the game. When the game is an RPG, for example, the current position of the player character 10 on the game map, the degree of growth, the number of enemies defeated by the player character 10, information that indicates the skill of the player, the cumulative play time, possession of a specific item, or the like may be appropriately set as the appearance condition depending on the game.

Figure 4:
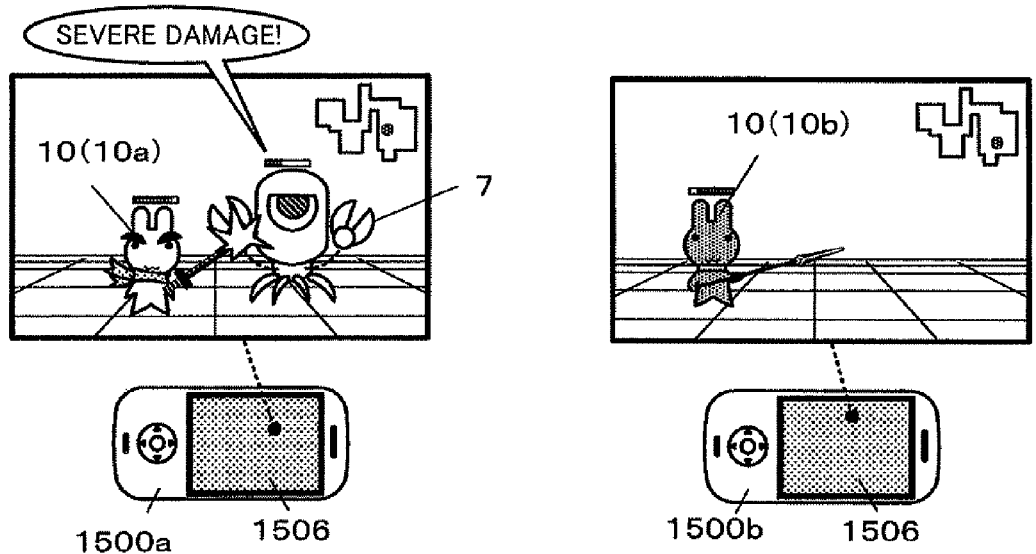
FIG. 4 is a schematic view illustrating the principle of the movement of an NPC from game world to game world.
Figure 4:
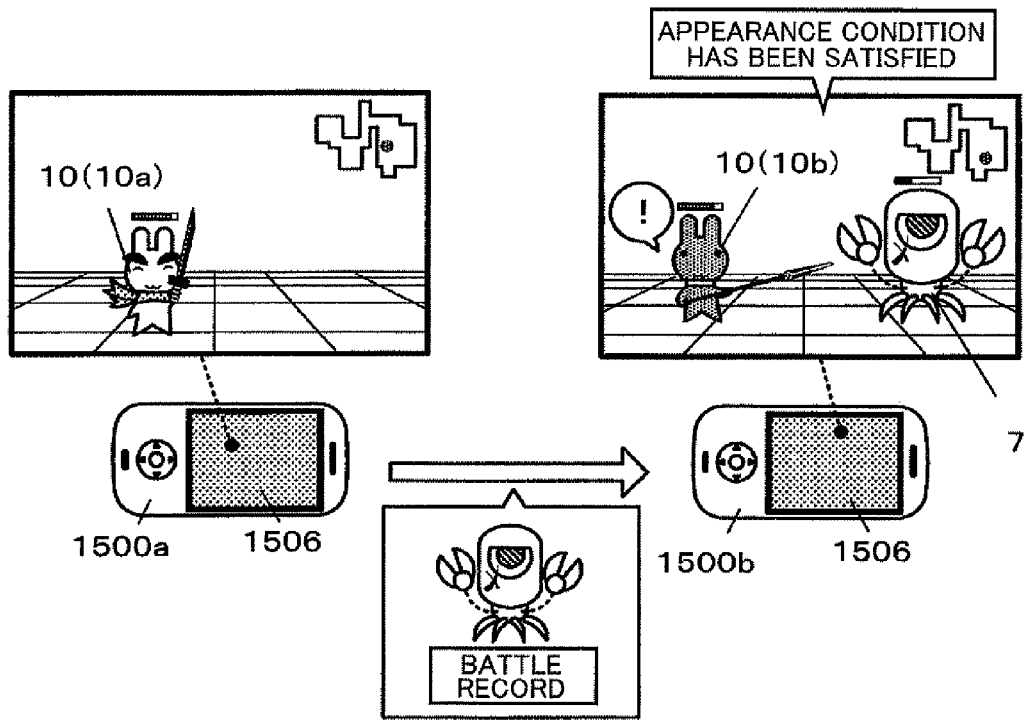

As illustrated in FIG. 4, when a given game world-to-game world transfer condition has been satisfied ((3) in FIG. 4), the special enemy character 7 disappears from the game world generated by the current node 1500a, moves to the game world generated by another node, and appears in the game world generated by the other node when the appearance condition has been satisfied ((4) in FIG. 4). Specifically, the special enemy character 7 can move from game world to game world.

The game world-to-game world transfer condition may be (1) a condition whereby the hit points (HP) of the special enemy character 7 have decreased by a specific value or a specific ratio (i.e., the special enemy character 7 has been damaged to a certain extent), (2) a condition whereby a given time has elapsed after the special enemy character 7 has appeared, (3) a condition whereby the player character 10 has become unable to battle against the special enemy character 7, (4) a condition whereby the player character 10 has used a given item that is harmful to the special enemy character 7, or the like. The game world-to-game world transfer condition may be appropriately set depending on the game genre.

When the game world-to-game world transfer condition has been satisfied, the character data of the special enemy character 7 is transmitted to the transfer destination. This means that the state of the special enemy character 7 (i.e., damages and advantages due to the battle in the game device 1500a) is maintained regardless of the transfer. For example, a battle wound, a battle record, and the like are maintained (remain unchanged). Note that the term "battle record" refers to historical information about the battle. The battle record includes index information (e.g., IP address, port number, user name, and MAC address) about the node (game device 1500) at which the battle has occurred, an increase or a decrease in HP, a list of items acquired during the battle, and the like.

Figure 5:
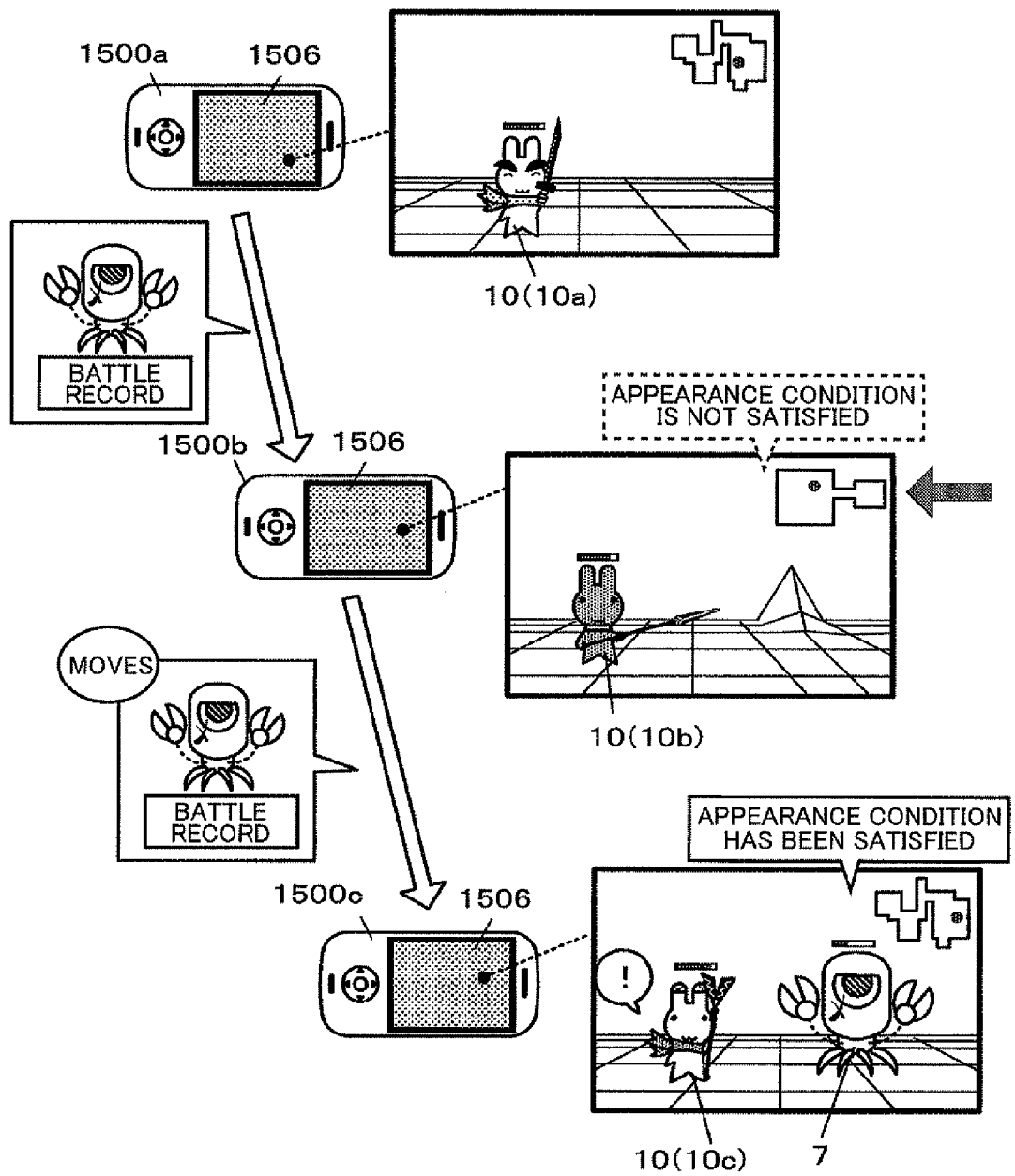
FIG. 5 is a schematic view illustrating a special character data transmission example.

When the appearance condition is not satisfied in the transfer destination, the special enemy character 7 moves to the game world generated by still another node (see FIG. 5). FIG. 5 illustrates an example in which it has been determined that the appearance condition is not satisfied in the game device 1500b (first transfer destination) since the game map where the player character 10 is present does not satisfy the requirement (standard), and the special enemy character 7 has moved to the game world generated by the next transfer destination (game device 1500c). Since the appearance condition has been satisfied in the next transfer destination (node) (game device 1500c), the special enemy character 7 has appeared in the game world generated by the next transfer destination.

Figure 6:
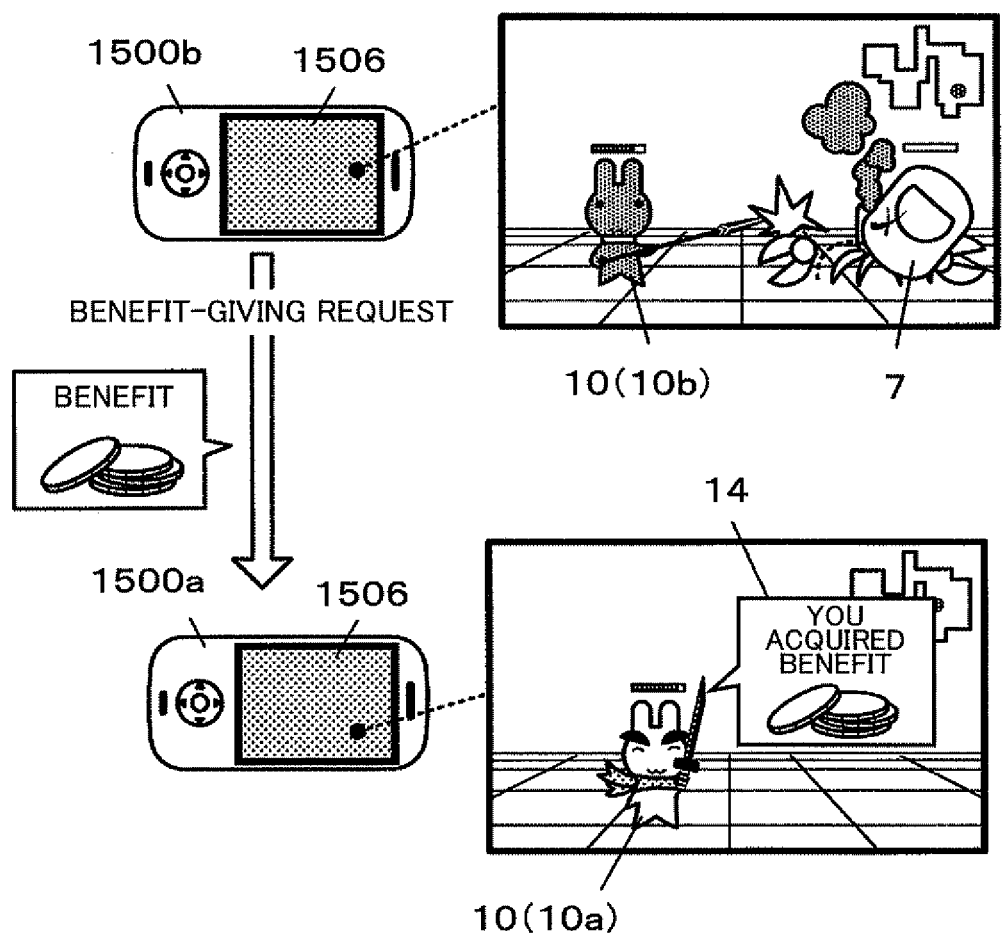
FIG. 6 is a schematic view illustrating the benefit-giving principle.

As illustrated in FIG. 6, when the special enemy character 7 has been defeated by the player character 10 that is operated using one game device 1500, benefit is given to the player who has battled against the special enemy character 7. Although FIG. 6 illustrates only the game device 1500a as the benefit-giving target game device, the benefit may also given to another player who has also battled against the special enemy character 7.

The benefit may be appropriately set. When the game is an RPG, for example, the HP of the player character 10 may be increased or decreased, the ability parameter value (e.g., attack capability, defense capability, or experience value) of the player character 10 may be increased or decreased, or an item (e.g., money, item, or key to a new game map) may be given to the player character 10. The benefit may be appropriately set depending on the game. The benefit given to the player character 10 is determined depending on the damage applied to the special enemy character 7. For example, high points are added to the HP of a player who has severely damaged the special enemy character 7 so that the game progresses advantageously for the player. When the game is not an RPG, the benefit may be set depending on the degree of contribution of each player until the NPC (special enemy character 7) has satisfied the benefit-giving condition.

Benefit designation information and a given benefit-giving request signal are transmitted to the node (game device 1500) (i.e., battle place) that is recorded in the battle record of the special enemy character 7, and the benefit is given at the node that has received the benefit designation information and the benefit-giving request signal. It is preferable to display a benefit-giving notification 14 on the game screen when the benefit is given, and reflected in the game.

When utilizing a P2P network, it is impossible to predict the time when each node (game device 1500) stops participating in the network, and the time when each node (game device 1500) terminates the game. When the player does not play the game for a long time in a state in which the special enemy character 7 appears, the special enemy character 7 cannot move to another node. In this case, other players cannot encounter and battle against the special enemy character 7.

Figure 7:
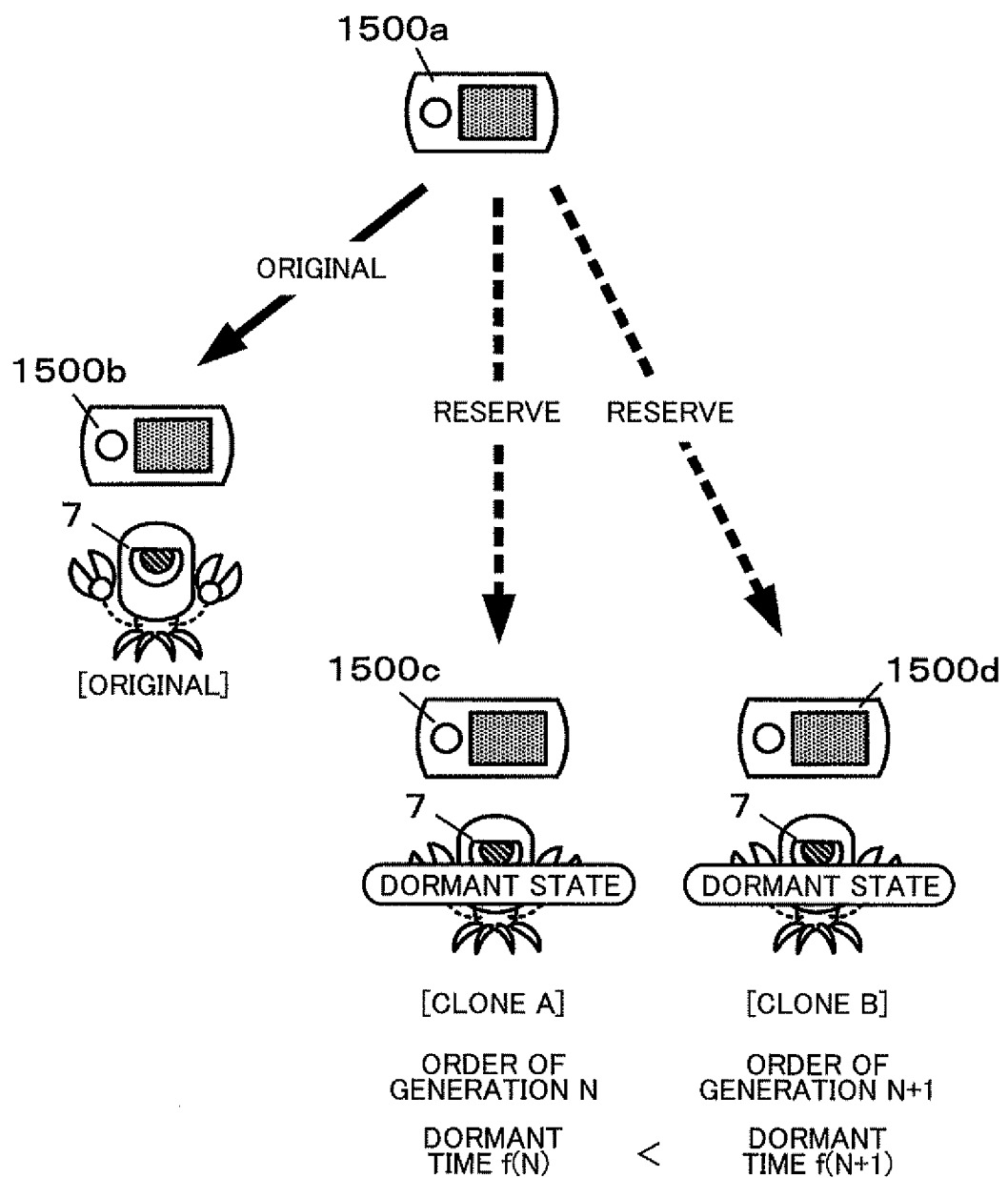
FIG. 7 is a schematic view illustrating the benefit-giving principle.

In order to deal with this problem, clone character data of the special enemy character 7 is transmitted to a node (game device 1500d) other than the transfer destination (see FIG. 7).

The clone character data includes information about the original character data of the special enemy character 7, identification information (e.g., specific character ID), and a dormant time. The received clone character data is not used until the dormant time elapses after the reception date/time. Specifically, the special enemy character 7 does not appear in the node that has received the clone character data even if the appearance condition has been satisfied. Note that the number of transmission destinations of the clone character data is not limited to 3, but may be less than 3, or may be 4 or more.

Figure 8:
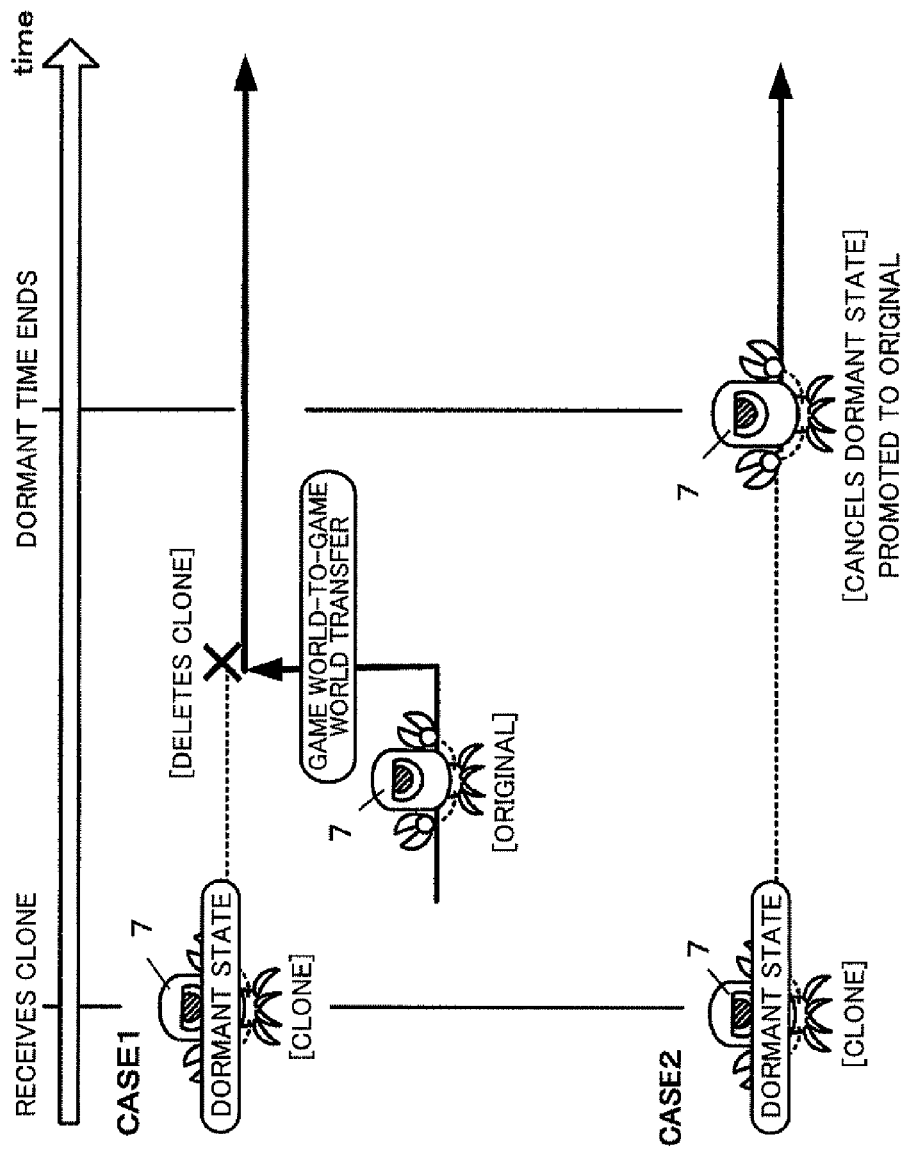
FIG. 8 is a schematic view illustrating the principle of special character retention measures.

The dormant time is set so that the dormant time increases in ascending order of generation of the clone data. As indicated by CASE 1 in FIG. 8, when the original character data of the special enemy character 7 has been received before the dormant time elapses after the reception timing of the clone character data, the clone character data is deleted, and the original character data is allowed to remain. As indicated by CASE 2 in FIG. 8, when the original character data of the special enemy character 7 has not been received even when the dormant time has elapsed after the reception timing of the clone character data, the dormant state of the clone character data is canceled. Specifically, the clone character data is used as new original character data (i.e., the original character data is generated), and the special enemy character 7 is caused to appear in the node when the appearance condition has been satisfied. Therefore, even if the special enemy character 7 cannot move to another node, an alternative special enemy character 7 can be transmitted via the P2P network.

Functional Blocks

A functional configuration that implements the first embodiment is described below.

Figure 9:
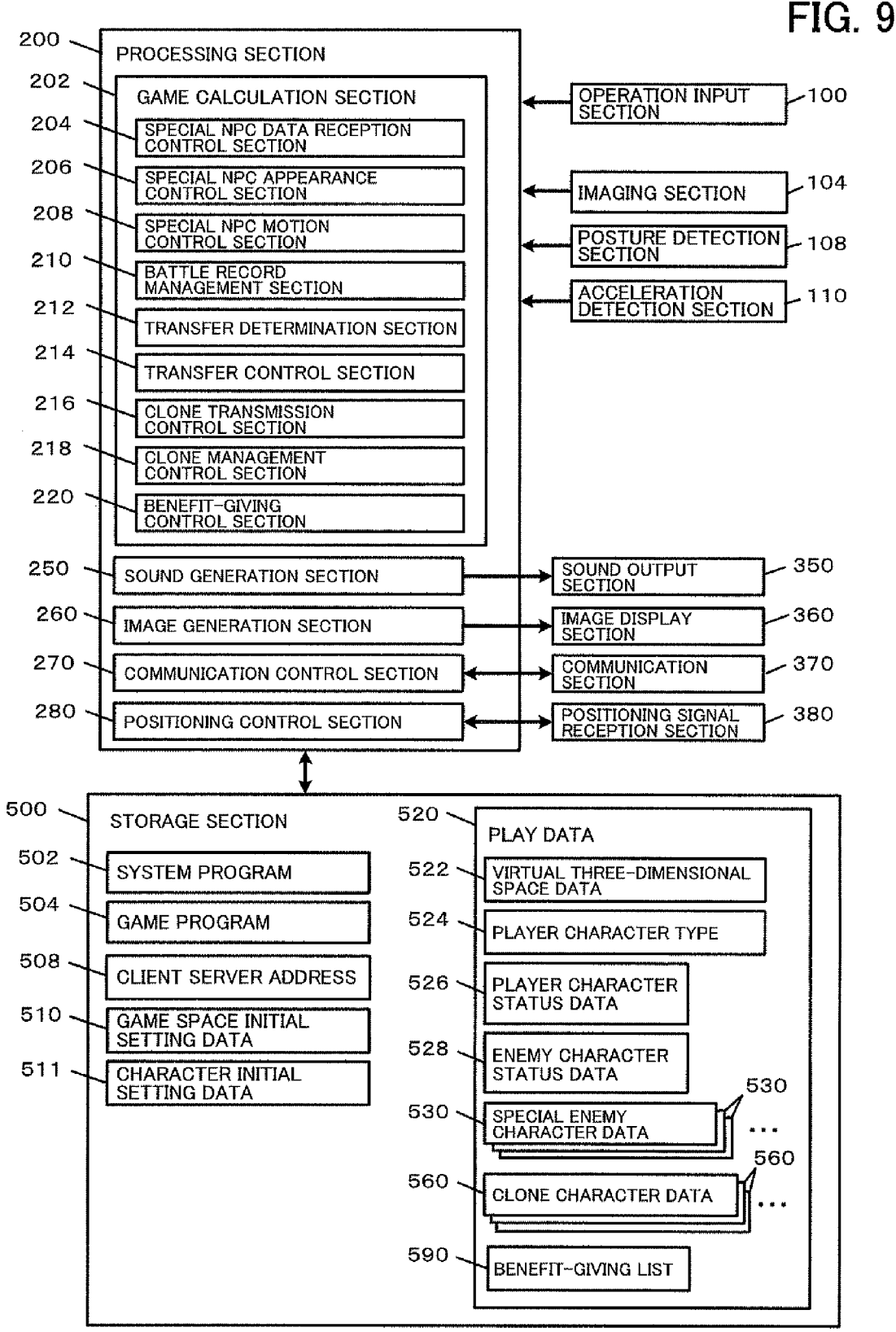
FIG. 9 is a functional block diagram illustrating a functional configuration example.

FIG. 9 is a functional block diagram illustrating an example of a functional configuration of the game device 1500 according to the first embodiment. The game device 1500 includes an operation input section 100, an imaging section 104, a posture detection section 108, an acceleration detection section 110, a processing section 200, a sound output section 350, an image display section 360, a communication section 370, and a storage section 500.

The operation input section 100 outputs an operation input signal to the processing section 200 based on an operation input performed by the player. For example, the operation input section 100 may be implemented by an element that is operated directly by the player with the finger (e.g., button switch, joystick, touch pad, and trackball), an element that detects motion or posture (e.g., acceleration sensor, angular velocity sensor, tilt sensor, and terrestrial magnetism sensor), and the like. The arrow key 1502, the home key 1504, and the touch panel 1506 illustrated in FIG. 1 correspond to the operation input section 100. The triaxial gyroscope 1556 and the triaxial acceleration sensor 1557 also correspond to the operation input section 100 when utilizing the detection values of the triaxial gyroscope 1556 and the triaxial acceleration sensor 1557 as an operation input.

The imaging section 104 converts light received from the imaging target into an electrical signal to generate digital image data, and outputs the digital image data to the processing section 200. The imaging section 104 may be implemented by a lens, a mechanical shutter, a shutter driver, a photoelectric conversion element (e.g., CCD image sensor module or CMOS image sensor module), a digital signal processor (DSP) that reads the amount of charge from a photoelectric conversion element and generates image data, an IC memory, and the like. The CCD camera module 1516 illustrated in FIG. 1 corresponds to the imaging section 104.

The acceleration detection section 110 detects the acceleration applied to the game device 1500. The triaxial acceleration sensor 1557 illustrated in FIG. 1 corresponds to the acceleration detection section 110.

The processing section 200 is implemented by electronic parts such as a microprocessor (e.g., CPU and GPU), an ASIC, and an IC memory. The processing section 200 exchanges data with (controls data exchange between) each functional section, and performs a calculation process based on a given program, data, the operation input signal from the operation input section 100, and the like to control the operation of the game device 1500. The control board 1550 illustrated in FIG. 1 corresponds to the processing section 200.

The processing section 200 includes a game calculation section 202, a sound generation section 250, an image generation section 260, a communication control section 270, and a positioning control section 280.

The game calculation section 202 performs a control process necessary for executing the game according to the first embodiment. For example, the game calculation section 202 performs (1) a process that disposes the background object in the virtual three-dimensional space to form the game space, (2) a process that disposes the player character 10 in the game space, and controls the motion of the player character 10 based on the operation input signal from the operation input section 100, (3) an AI control process that causes the enemy character 12 to appear, and automatically controls the enemy character 12, (4) an encounter process on the player character 10 and an NPC, (5) a process that updates the character data and the position of the object in order to reflect the battle process and the battle result, (6) a process that manages play data that indicates the game status, and the like. The game calculation section 202 may also appropriately perform a timing process (e.g., time limit management process) that utilizes a system clock signal, a flag management process, and the like.

The game calculation section 202 includes a special NPC data reception control section 204, a special NPC appearance control section 206, a special NPC motion control section 208, a battle record management section 210, a transfer determination section 212, a transfer control section 214, a clone transmission control section 216, a clone management control section 218, and a benefit-giving control section 220.

The special NPC data reception control section 204 controls reception of character data of a special NPC (i.e., special enemy character 7) that can move from node to node. The received data is stored in the storage section 500.

The special NPC appearance control section 206 detects whether or not the appearance condition whereby the special NPC that can move from node to node appears in the game world has been satisfied, and causes the special NPC to appear when the appearance condition has been satisfied. The special NPC appearance control section 206 performs a process that causes the special enemy character 7 to appear within the field of view range of the player character, and a process that causes the special enemy character 7 to confront the player character 10.

The special NPC motion control section 208 performs an automatic motion control process (AI control process) on the special NPC that can move from node to node.

The battle record management section 210 generates and manages the battle record of the special enemy character 7 and the player character 10. More specifically, the battle record management section 210 manages the history in the game world where the special NPC that can move from node to node has appeared.

The transfer determination section 212 determines whether or not the game status has satisfied the game world-to-game world transfer condition. The transfer determination section 212 also determines that the game world-to-game world transfer condition has been satisfied when a state in which the appearance condition is not satisfied has continued for a given time.

The transfer control section 214 controls the movement of the special character from game world to game world. More specifically, the transfer control section 214 performs a process that preferentially selects another computer in which the game status has satisfied a given similarity condition as the transfer destination node, and a process that transmits the character data of the special enemy character 7 to the transfer destination node, and deletes the character data after transmitting the character data to the transfer destination node.

The clone transmission control section 216 performs a control process that generates a clone of the character data of the special NPC (enemy character 7), and transmits the clone to a node that differs from the transmission destination of the original character data of the special NPC (enemy character 7). The clone transmission control section 216 sets the dormant time when generating the clone so that the dormant time increases as the later the clone is generated.

The clone management control section 218 performs a process that deletes the clone character data when the clone character data has been received, and the original character data of the special NPC (enemy character 7) has been received before the dormant time elapses after the clone character data reception timing, and a process that generates the original character data of the special NPC (enemy character 7) from the clone character data when the original character data of the special NPC (enemy character 7) has not been received before the dormant time has elapsed after the clone character data reception timing. Specifically, the clone management control section 218 performs an original revival process that promotes the clone to the original.

The benefit-giving control section 220 performs a control process that gives benefit to the player when the game status (particularly a status concerning the special NPC (enemy character 7)) has satisfied a benefit-giving condition. In the first embodiment, the benefit-giving control section 220 performs a process that gives benefit to each player who has battled against the special character 7 when the special character 7 has been defeated. For example, the benefit-giving control section 220 performs a process that determines benefit corresponding to the degree of contribution referring to the battle record, a process that transmits information that indicates the benefit and a benefit-giving request signal to each node (game device 1500) along the moving path, a process that retransmits the benefit-giving request signal to a node that has not received the benefit-giving request signal within a given time limit, and a process that gives benefit to the player of the node (game device) when the benefit-giving request signal has been received from another node (another game device).

The sound generation section 250 is implemented by a processor (e.g., digital signal processor (DSP) or sound synthesis IC), an audio codec that can reproduce a sound file, and the like. The sound generation section 250 generates sound signals of a game effect sound, background music (BGM), or an operation sound based on the processing results of the game calculation section 202, and outputs the generated sound signals to the sound output section 350.

The sound output section 350 is implemented by a device that outputs a game effect sound, BGM, a telephone voice, and the like based on the sound signals input from the sound generation section 250. The speaker 1510 illustrated in FIG. 1 corresponds to the sound output section 350.

The image generation section 260 is implemented by a processor (e.g., graphics processing unit (GPU) or a digital signal processor (DSP)), a video signal IC, a program (e.g., video codec), a drawing frame IC memory (e.g., frame buffer), a texture data IC memory, and the like. The image generation section 260 generates a game screen (image) every frame (e.g., 1/60th of a second) based on the processing results of the game calculation section 202, and outputs image signals of the generated game screen (image) to the image display section 360.

The image display section 360 displays a game image based on the image signals input from the image generation section 260. The image display section 360 may be implemented by an image display device such as a flat panel display, a cathode-ray tube (CRT), a projector, or a head-mounted display. The touch panel 1506 illustrated in FIG. 1 corresponds to the image display section 360.

The communication control section 270 performs a data communication connection process and a data communication process, and exchanges data with an external device via the communication section 370. The communication control section 270 can implement a super-node hybrid P2P network. Note that a P2P network may be implemented by appropriately utilizing known technology (detailed description thereof is omitted).

The communication section 370 connects to the communication channel 1 to implement communication. The communication section 370 may be implemented by a transceiver, a modem, a terminal adapter (TA), a jack for a communication cable, a control circuit, and the like. The wireless communication module 1553 illustrated in FIG. 1 corresponds to the communication section 370.

The positioning control section 280 performs a control process (i.e., positioning calculation process and positioning calculation result management process) that calculates position information from a signal obtained from a positioning system through the positioning signal reception section 380. The GPS module 1554 illustrated in FIG. 1 corresponds to the positioning control section 280.

The positioning signal reception section 380 receives information (e.g., GPS signal) provided by a positioning system (e.g., GPS). The GPS antenna 1514 illustrated in FIG. 1 corresponds to the positioning signal reception section 380. When utilizing known position information about a radio station (e.g., mobile phone base station) for the positioning calculation process, the wireless communication module 1553 that performs wireless communication with the base station also corresponds to the positioning signal reception section 380.

The storage section 500 stores a program, data, and the like that implement a function of causing the processing section 200 to integrally control the game device 1500. The storage section 500 is used as a work area for the processing section 200, and temporarily stores the results of calculations performed by the processing section 200 based on a program, data input from the operation section 100, and the like. The function of the storage section 500 may be implemented by an IC memory (e.g., RAM and ROM), a magnetic disk (e.g., hard disk), an optical disk (e.g., CD-ROM and DVD), and the like.

The IC memory 1552 included in the control board 1550 and the memory card 1540 illustrated in FIG. 1 correspond to the storage section 500.

In the first embodiment, the storage section 500 stores a system program 502 and a game program 504.

The system program 502 implements the basic functions of the game device 1500 (computer). The game program 504 causes the processing section 200 to implement the function of the game calculation section 202. The game program 504 is stored in the memory card 1540 in advance. Note that the game program 504 may be downloaded from a given server before starting the game.

The storage section 500 also stores a client server address 508, a game space initial setting data 510, and character initial setting data 511. The client server address 508, the game space initial setting data 510, and the character initial setting data 511 are stored in the memory card 1540 in advance. Note that the client server address 508, the game space initial setting data 510, and the character initial setting data 511 may be downloaded from a given server before starting the game.

The storage section 500 also stores play data 520 that is generated during the game, and updated at any time. The storage section 500 also appropriately stores data necessary when performing each process (e.g., decompressed texture data, elapsed time, timer value, counter value, and flag).

The client server address 508 is address information that indicates the communication destination of a server (client server 1600 illustrated in FIG. 2) that is initially accessed when the player plays the game.

The game space initial setting data 510 is initial setting data that defines the background object that forms the stage of the game. The game space initial setting data 510 includes model data, texture data, position data and the like of the background object.

The character initial setting data 511 includes initial setting data of the game character such as the player character 10 and the normal enemy character 12 that equally appears in each game world. The character initial setting data 511 includes the initial values of model data, texture data, motion data, and an ability parameter (e.g., attack capability, defense capability, and HP) corresponding to each character.

The play data 520 includes data that indicates the game play status (i.e., data that indicates the game world). In the first embodiment, the play data 520 includes virtual three-dimensional space data 522, a player character type 524, player character status data 526, enemy character status data 528, special enemy character data 530, clone character data 560, and benefit-giving list 590.

The virtual three-dimensional space data 522 includes information about the object disposed in the virtual three-dimensional space (e.g., player character 10, enemy character 12, special enemy character 7, and background object), and a virtual camera (CG viewpoint). The information about the object of the special enemy character 7 is added when the special enemy character 7 has appeared in the game space (world), and is deleted when the special enemy character 7 has moved to another game space (world).

The player character type 524 is identification information about the character selected by the player as the player character 10.

The player character status data 526 includes information that indicates the current status of the player character 10. For example, the player character status data 526 includes the coordinates, the posture, and the moving speed in the game space, a motion ID, motion control data, the HP, the ability parameter values, and the like.

The enemy character status data 528 includes information that indicates the current status of each enemy character 12. The information about the special enemy character 7 is added when the special enemy character 7 has appeared in the game space (world), and is deleted when the special enemy character 7 has moved to another game space (world).

The special enemy character data 530 includes the original character data of the special NPC (special enemy character 7) that has been received.

Figure 10:
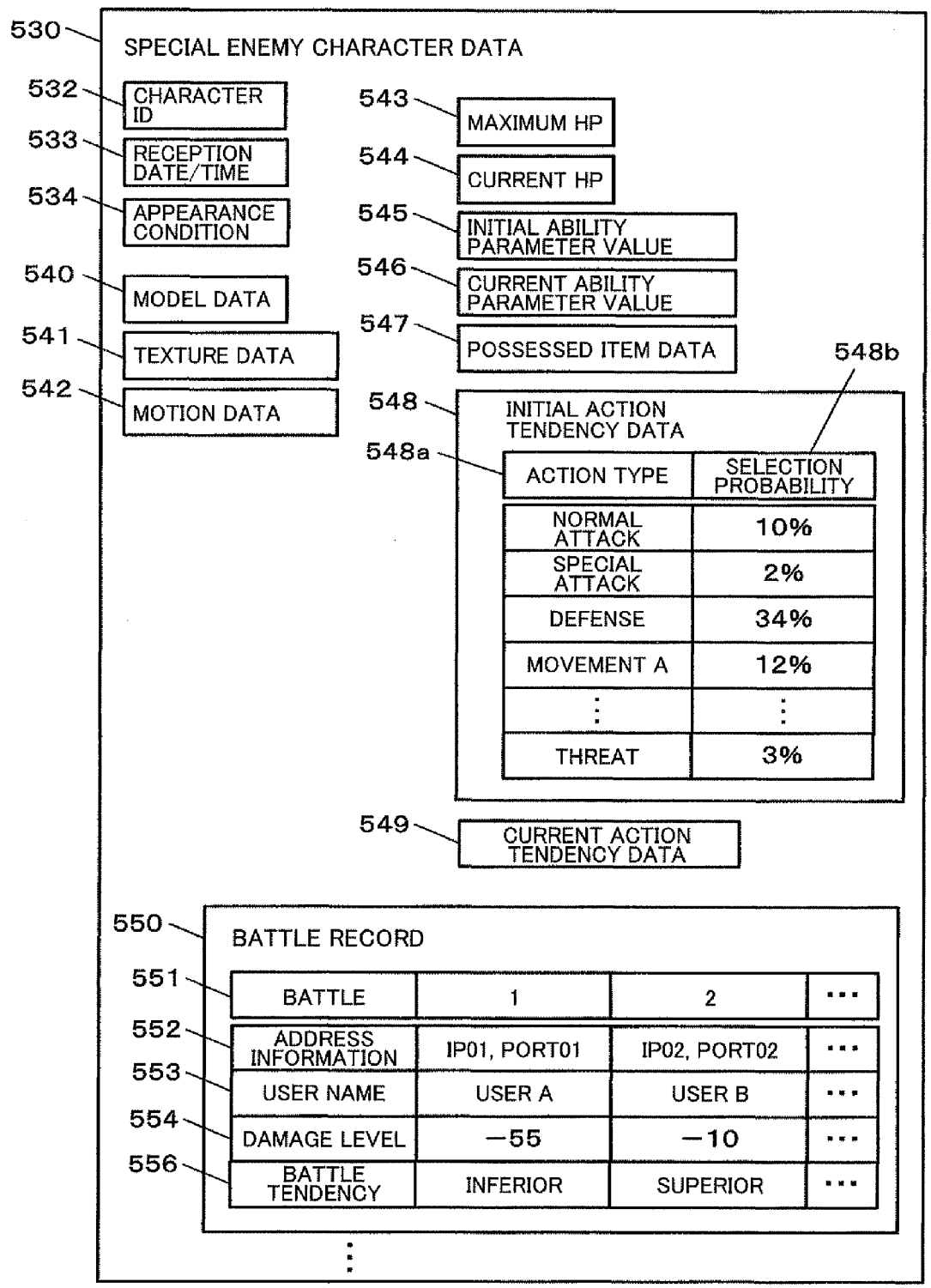
FIG. 10 is a view illustrating a data configuration example of special enemy character data.

As illustrated in FIG. 10, the special enemy character data 530 includes a character ID 532 (i.e., identification information specific to the special NPC (special enemy character 7)), a reception date/time 533, and an appearance condition 534. The identification information about the game map where the player character 10 is currently present, the coordinates range on the map, the degree of growth, the number of enemies defeated, or the like may be appropriately set as the appearance condition 534. The special enemy character data 530 includes model data 540, texture data 541, motion data 542, maximum HP 543, current HP 544, an initial ability parameter value 545 (e.g., experience value, attack capability, defense capability, or moving speed), a current ability parameter value 546, possessed item data 547, initial action tendency data 548, current action tendency data 549, and a battle record 550.

The initial action tendency data 548 and the current action tendency data 549 are information that defines the action pattern of the special enemy character. The initial action tendency data 548 indicates the action tendency of the special enemy character in an initial state, and the current action tendency data 549 indicates the action tendency of the special enemy character during game play. The initial action tendency data 548 includes an action type 548a and a selection probability 548b. The current action tendency data 549 is configured in the same manner as the initial action tendency data 548.

The battle record 550 includes a battle order 551, address information 552 about the game device 1500 in which a battle against the special enemy character has occurred, a user name 553 of the player who has battled against the special enemy character, a damage level 554, and a battle tendency 556 that indicates whether the special enemy character was superior or inferior. The battle tendency 556 is determined by comparing the damage level of the player character 10 with the damage level of the special enemy character. The battle tendency 556 may also include additional battle information.

The clone character data 560 includes the clone character data that has been received.

Figure 11:
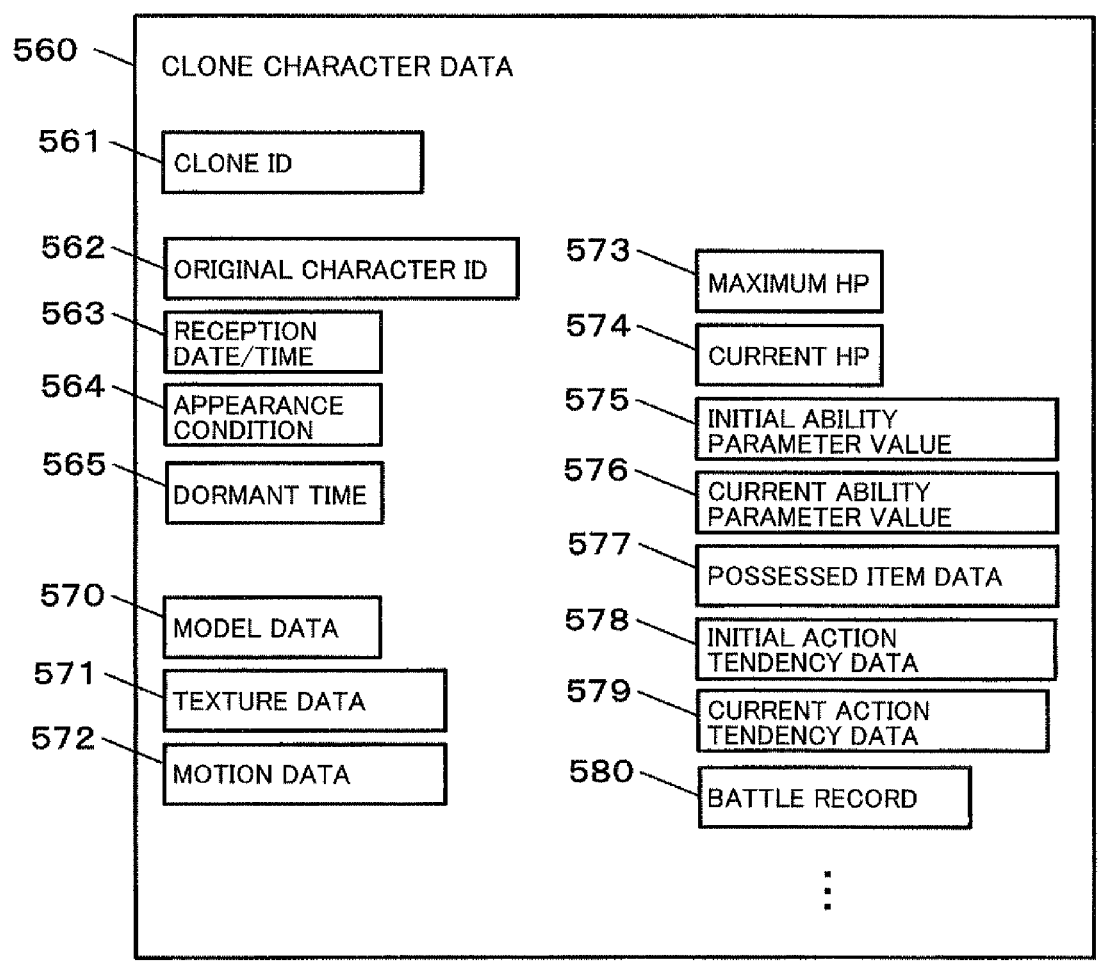
FIG. 11 is a view illustrating a data configuration example of clone character data.

As illustrated in FIG. 11, the clone character data 560 includes a clone ID 561, an original character ID 562, a reception date/time 563, an appearance condition 564, a dormant time 565, model data 570, texture data 571, motion data 572, maximum HP 573, current HP 574, an initial ability parameter value 575, a current ability parameter value 576, possessed item data 577, initial action tendency data 578, current action tendency data 579, and a battle record 580, for example.

The original character ID 562 is the same as the character ID 532 of the original special enemy character 7. The appearance condition 564, the model data 570, the texture data 571, the motion data 572, the maximum HP 573, the current HP 574, the initial ability parameter value 575, the current ability parameter value 576, the possessed item data 577, the initial action tendency data 578, the current action tendency data 549, and the battle record 580 are copies of the same parameter values of the original special enemy character 7.

The benefit-giving list 590 includes the benefit-giving destination and the details of the benefit. As illustrated in FIG. 12, the benefit-giving list 590 includes address information 592 about the node (game device 1500) used by the player who is granted the benefit, a benefit 594, and a time limit 596. The time limit 596 indicates a date obtained by adding a given time limit to the registration date. The player (node (game device 1500)) is registered in the benefit-giving list 590 when the special character has satisfied a given benefit-giving condition.

Process Flow

The flow of a process according to the first embodiment is described below with reference to FIGS. 13 to 17. The following process is implemented by causing the game device 1500 to read the system program 502, the game program 504, and the setting data, and execute the system program 502 and the game program 504. Note that the game sound and the game screen may be generated and output in the same manner as in a known video game (description thereof is omitted).

Figure 13:
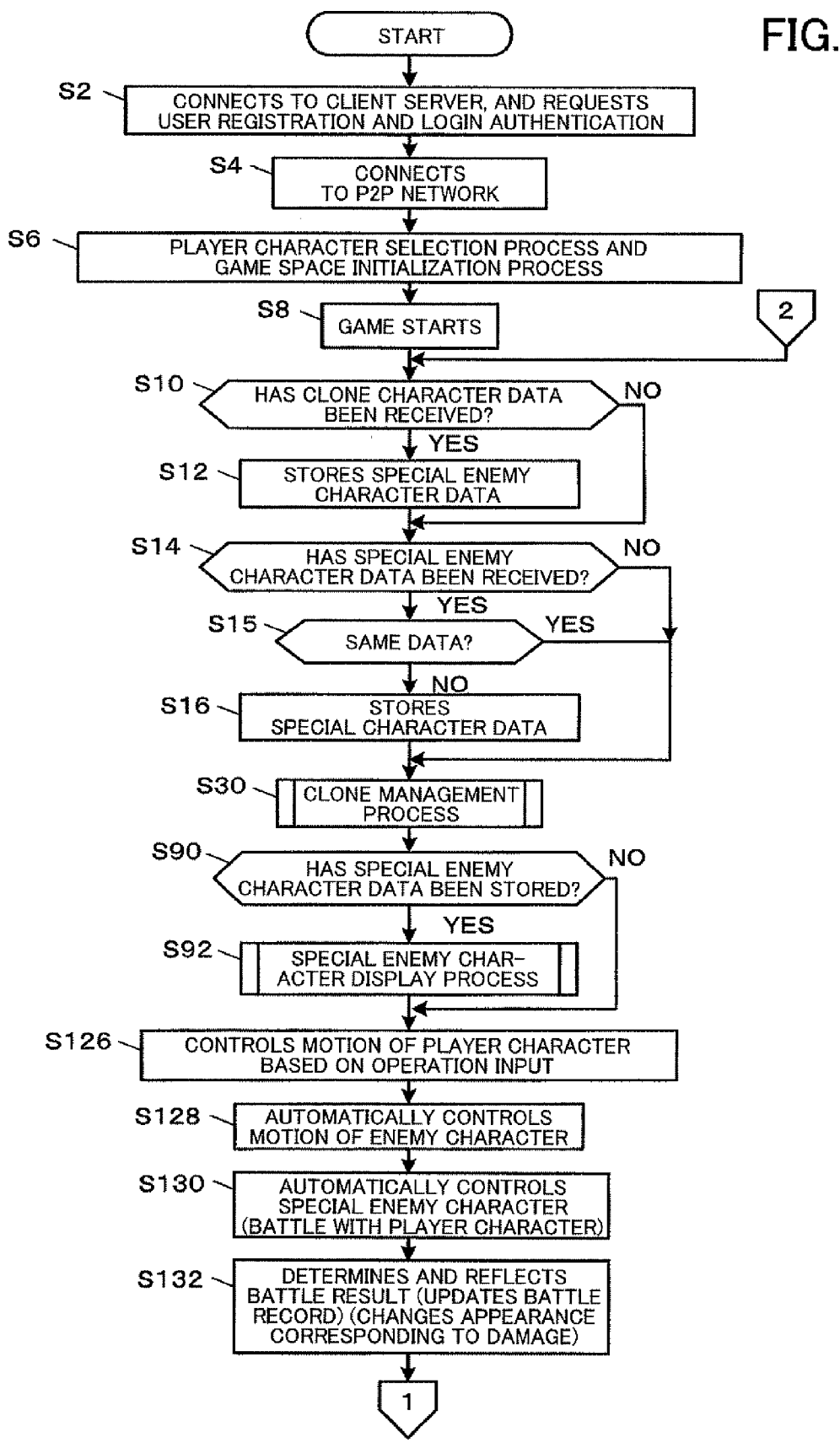
FIG. 13 is a flowchart illustrating the flow of a main process.
Figure 14:
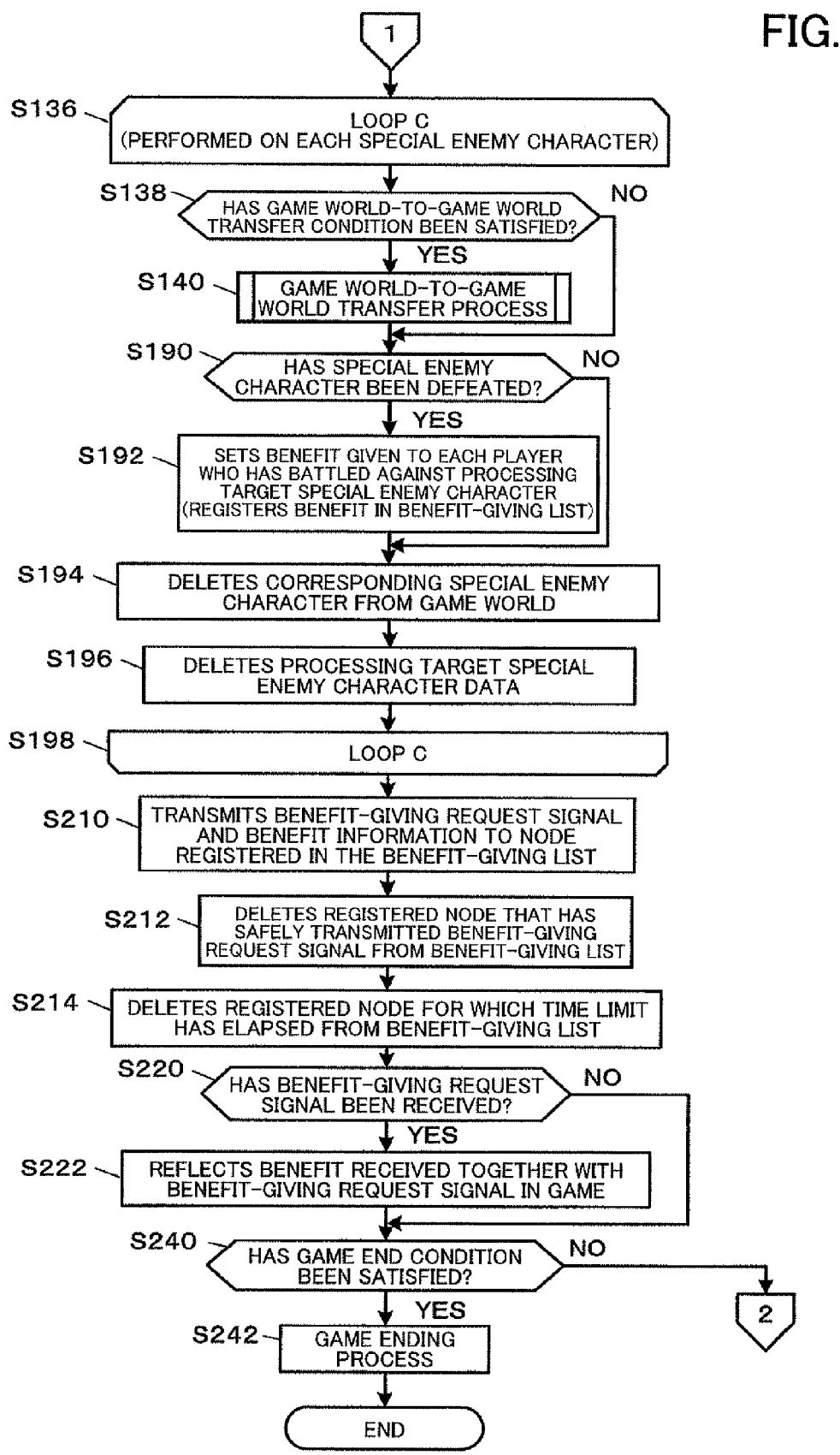
FIG. 14 is a flowchart that follows FIG. 13.

FIGS. 13 and 14 are flowcharts illustrating the flow of the main process according to the first embodiment. In a step S2, the processing section 200 refers to the client server address 508, accesses the client server 1600, and requests user registration and login authentication.

When login authentication has completed, the processing section 200 acquires the super-node index information from the client server 1600, accesses an arbitrary super-node, and connects to a P2P network that includes a game device (node) that executes the same game (step S4).

The processing section 200 then performs a player character selection process and a game space initialization process (step S6). The processing section 200 displays a selection list referring to the character initial setting data 511, and allows the player to select a desired character. The processing section 200 stores the selection result in the storage section 500 as the player character type 524 included in the play data 520. The processing section 200 generates the game space in the virtual three-dimensional space referring to the game space initial setting data 510, and disposes the virtual camera, the object of the player character 10, and the object of the enemy character 12 in the game space. The virtual three-dimensional space data 522, the player character status data 526, and the enemy character status data 528 are thus generated as the play data 520, and initialized. The following description is given on the assumption that the virtual camera is automatically controlled to capture (photograph) the player character 10.

When the game has started (step S8), the processing section 200 repeats steps S10 to S240 (FIG. 14) in a given control cycle until a game end condition is satisfied.

When the processing section 200 has determined that the clone character data 560 has been received from another node (another game device) in one control cycle (YES in step S10), the processing section 200 stores the received data in the storage section 500 (step S12).

When the processing section 200 has determined that the special enemy character data 530 has been received from another node (YES in step S14), and the special enemy character data 530 indicates a character that differs from the character indicated by the special enemy character data 530 (including the special enemy character data 530 of the special enemy character 7 that has been restored based on the clone character data 560) that has been received (YES in step S15), the processing section 200 stores the received data as the play data 520 (step S16). In this case, the processing section 200 sets a new battle order 551 as the battle record 550, stores the P2P address information about the game device and the user name of the player as the corresponding address information 552 and user name 553, and initializes the damage level 554 to "0". The processing section 200 then performs a clone management process (step S30).

Figure 15:
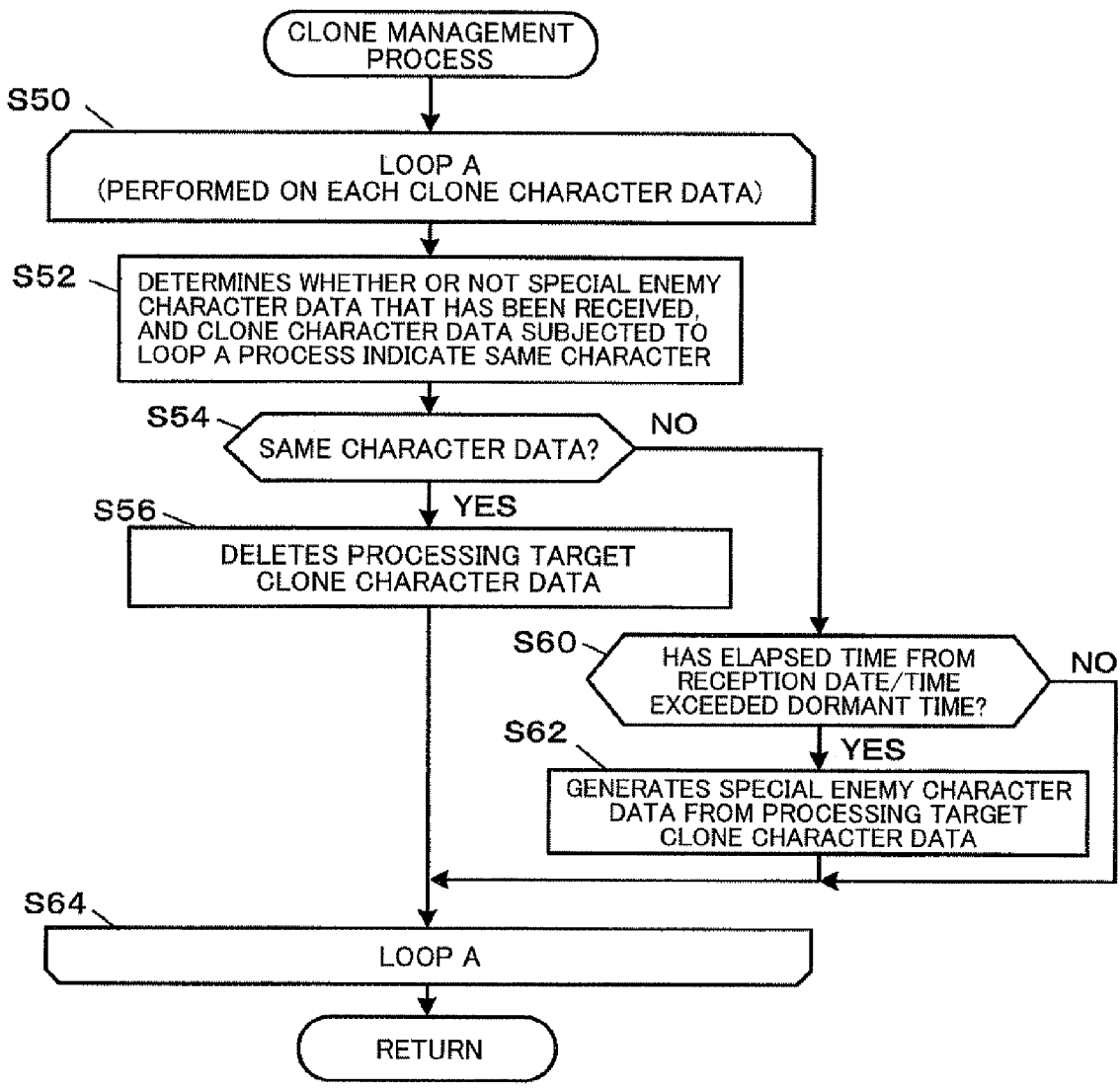
FIG. 15 is a flowchart illustrating the flow of a clone management process.

FIG. 15 is a flowchart illustrating the flow of the clone management process. In the clone management process, the processing section 200 performs a loop A process on each clone character data 560 that has been stored as the play data 520 (steps S50 to S64).

In the loop A process, the processing section 200 determines whether or not the special enemy character data 530 that has been received, and the clone character data 560 subjected to the loop A process indicate the same character (step S52). For example, the processing section 200 may compare the character ID 532 of the special enemy character data 530 with the original character ID 562 of the clone character data 560. The processing section 200 may compare the current HP 544 of the special enemy character data 530 with the current HP 574 of the clone character data 560, and compare the current ability parameter value 546 of the special enemy character data 530 with the current ability parameter value 576 of the clone character data 560.

When the processing section 200 has determined that the special enemy character data 530 and the clone character data 560 indicate the same character (YES in step S54), the processing section 200 deletes the processing target clone character data 560 (step S56), and terminates the loop A process. When the processing section 200 has determined that the special enemy character data 530 and the clone character data 560 do not indicate the same character (NO in step S54), the processing section 200 determines whether or not the elapsed time from the reception date/time 563 has exceeded the dormant time 565 (step S60). When the processing section 200 has determined that the elapsed time from the reception date/time 563 has exceeded the dormant time 565 (YES in step S60), the processing section 200 generates (duplicates) the special enemy character data 530 from the processing target clone character data 560, stores the special enemy character data 530 as the play data 520 (step S62), and terminates the loop A process.

More specifically, the original character 562 is set as the character ID 532 of the generation target special enemy character data 530. The current date is stored as the reception date/time 533. The initial appearance condition 534, the model data 540, the texture data 541, the maximum HP 543, the current HP 544, the ability parameter value 545, the current ability parameter value 546, the possessed item data 547, the initial action tendency data 548, the current action tendency data 549, and the battle record 550 are respectively set to the same parameter values as those of the processing target clone character data 560. Therefore, the generated special enemy character data 530 indicates a state in which the dormant state of the clone has been canceled.

When the processing section 200 has determined the elapsed time from the reception date/time 563 has not exceeded the dormant time 565 (NO in step S60), the processing section 200 skips the process that generates (duplicates) the special enemy character data 530.

When the loop A process has been performed on each clone character data 560, the processing section 200 terminates the clone management process.

Again referring to the flowchart illustrated in FIG. 13, when the processing section 200 has determined that the special enemy character data 530 has been stored as the play data 520 (YES in step S90), the processing section 200 performs a special enemy character display process, and causes the special enemy character 7 indicated by the special enemy character data 530 to appear in the game space (step S92).

Figure 16:
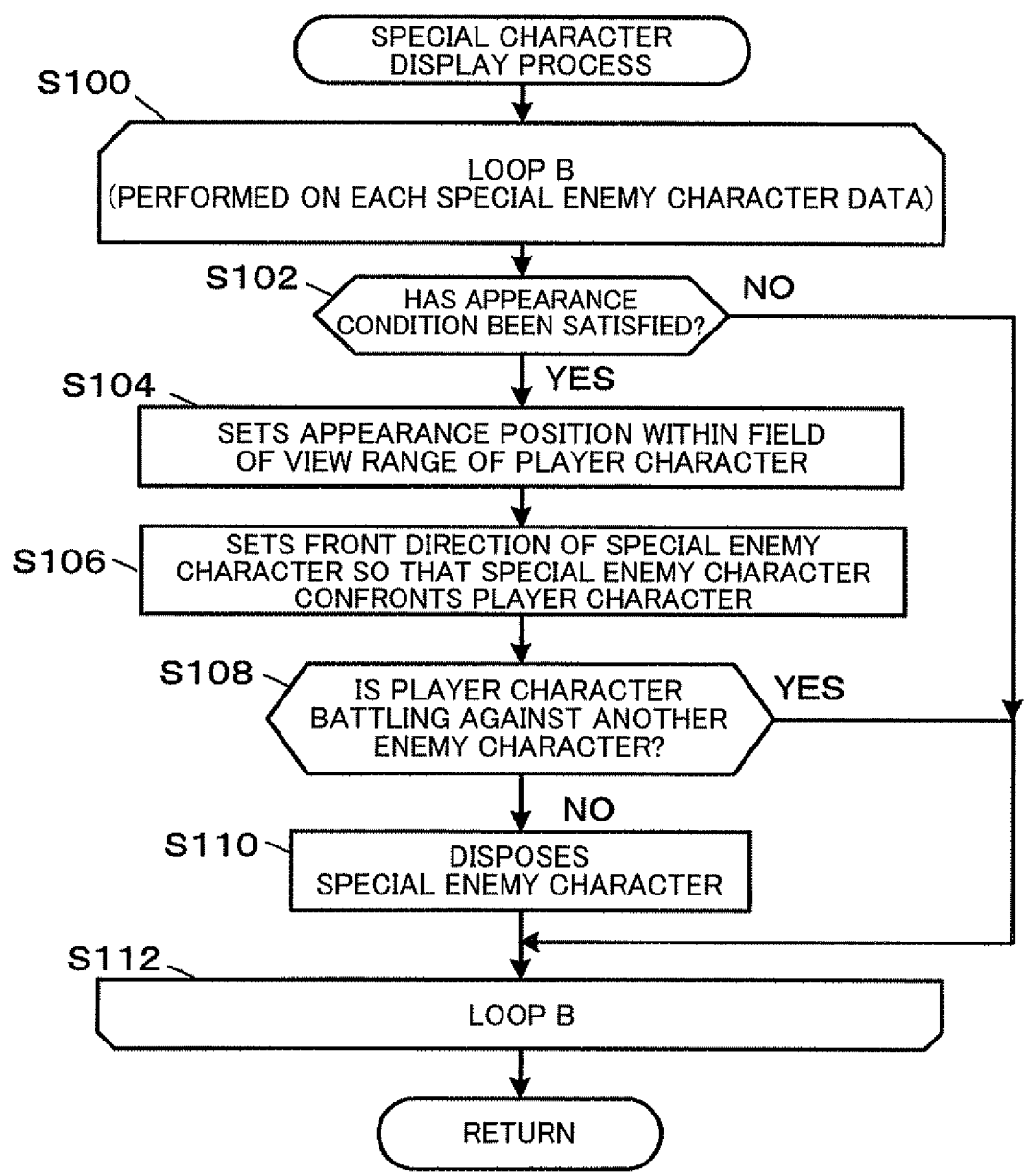
FIG. 16 is a flowchart illustrating the flow of a special enemy character display process.

FIG. 16 is a flowchart illustrating the flow of the special enemy character display process. In the special enemy character display process, the processing section 200 performs a loop B process on each special enemy character data 530 stored as the play data 520 (steps S100 to S112).

In the loop B process, the processing section 200 refers to the appearance condition 564 included in the processing target special enemy character data 530, and determines whether or not the current game status has satisfied the appearance condition. When the processing section 200 has determined that the current game status has satisfied the appearance condition (YES in step S102), the processing section 200 sets the appearance position within a given range relative to the player character 10 (step S104), and sets the front direction of the special enemy character 7 so that the special enemy character 7 confronts the player character 10 (step S106).

When the processing section 200 has determined that the player character 10 does not battle against another enemy character 12 (NO in step S108), the processing section 200 causes the special enemy character 7 to appear (step S110).

More specifically, a model based on the model data 540 and the texture data 541 is disposed in the game space, and status information about the special enemy character 7 is registered as the enemy character status data 528. When generating the special enemy character 7 as a model that has a jointed (articulated structure), representation in which one hand (arm) of the special enemy character 7 disappears during a battle can be implemented by rewriting the model data 540. In this case, when it has been determined that the battle order 551 is "1" referring to the battle record 550, the maximum HP 543 and the initial ability parameter value 545 are registered. When it has been determined that the battle order 551 is "2" or more, the current HP 544, the current ability parameter value 546, and the possessed item data 547 are registered. The front direction of the special enemy character 7 is set to the direction that has been calculated in advance. The information about the object of the special enemy character 7 is thus added to the virtual three-dimensional space data 522. When the processing section 200 has caused the special enemy character 7 to appear, the processing section 200 terminates the loop B process (step S112).

When the processing section 200 has determined that the current game status does not satisfy the appearance condition (NO in step S102), or determined that the player character 10 is battling against another enemy character 12 (YES in step S108), the processing section 200 terminates the loop B process without causing the special enemy character 7 to appear (step S112). When the loop B process has been performed on each special enemy character data 530, the processing section 200 terminates the special enemy character display process.

Again referring to the flowchart illustrated in FIG. 13, the processing section 200 controls the motion of the player character 10 based on an operation input (step S126), and automatically controls the motion of the enemy character 12 (normal enemy character set to the game map) (step S128). The processing section 200 automatically controls the special enemy character 7 that has been disposed in the game space (step S130). The virtual three-dimensional space data 522, the player character status data 526, and the enemy character status data 528 are appropriately updated during the above control process.

The action of the player character 10, the action of the normal enemy character 12 set to the game map, and the action of the special enemy character 7 are determined by the above steps. The processing section 200 then determines and reflects the battle result (step S132). For example, the processing section 200 determines whether or not the player character 10 has encountered the enemy character 12 or the special enemy character 7, performs a hit determination process and a damage determination process, subtracts points corresponding to the damage from the HP, and a process that applies an apparent change (wound, deformation, or discoloration) corresponding to the damage to the texture of the character. The player character status data 526 and the enemy character status data 528 are thus updated.

The battle result is reflected by updating the special enemy character data 530 of the special enemy character 7. More specifically, the processing section 200 adds the damage level applied to the special enemy character 7 due to the battle to the damage level 554 stored as the battle record 550. The processing section 200 sets the current HP and the current ability parameter value of the special enemy character 7 stored as the enemy character status data 528 as the current HP 544 and the current ability parameter value 546 of the special enemy character data 530. The processing section 200 compares the damage level of the player character 10 and the damage level of the special enemy character 7 due to the battle, and updates the battle tendency 556. The processing section 200 also rewrites the texture data 541 based on the battle result to express a battle wound, or rewrites the model data 540 so that the part (e.g., one arm) of the special enemy character 7 is removed.

Again referring to the flowchart illustrated in FIG. 14, the processing section 200 performs a loop C process on each special enemy character data 530 stored as the play data 520 (steps S136 to S194).

In the loop C process, the processing section 200 determines whether or not the processing target special enemy character data 530 has satisfied the game world-to-game world transfer condition. Examples of the game world-to-game world transfer condition include (1) a condition whereby the HP (hit points) of the special enemy character 7 have decreased by a specific value or a specific ratio (i.e., the special enemy character 7 has been damaged to a certain extent), (2) a condition whereby a given time has elapsed after the special enemy character 7 has appeared, (3) a condition whereby the player character 10 has become unable to battle against the special enemy character 7, (4) a condition whereby the player character 10 has used a given item that is avoided by the special enemy character 7, (5) a condition whereby a state in which the appearance condition is not satisfied has continued for given time, and the like. When the processing section 200 has determined that the processing target special enemy character data 530 has satisfied the game world-to-game world transfer condition (YES in step S138), the processing section 200 performs a game world-to-game world transfer process (step S140).

Figure 17:
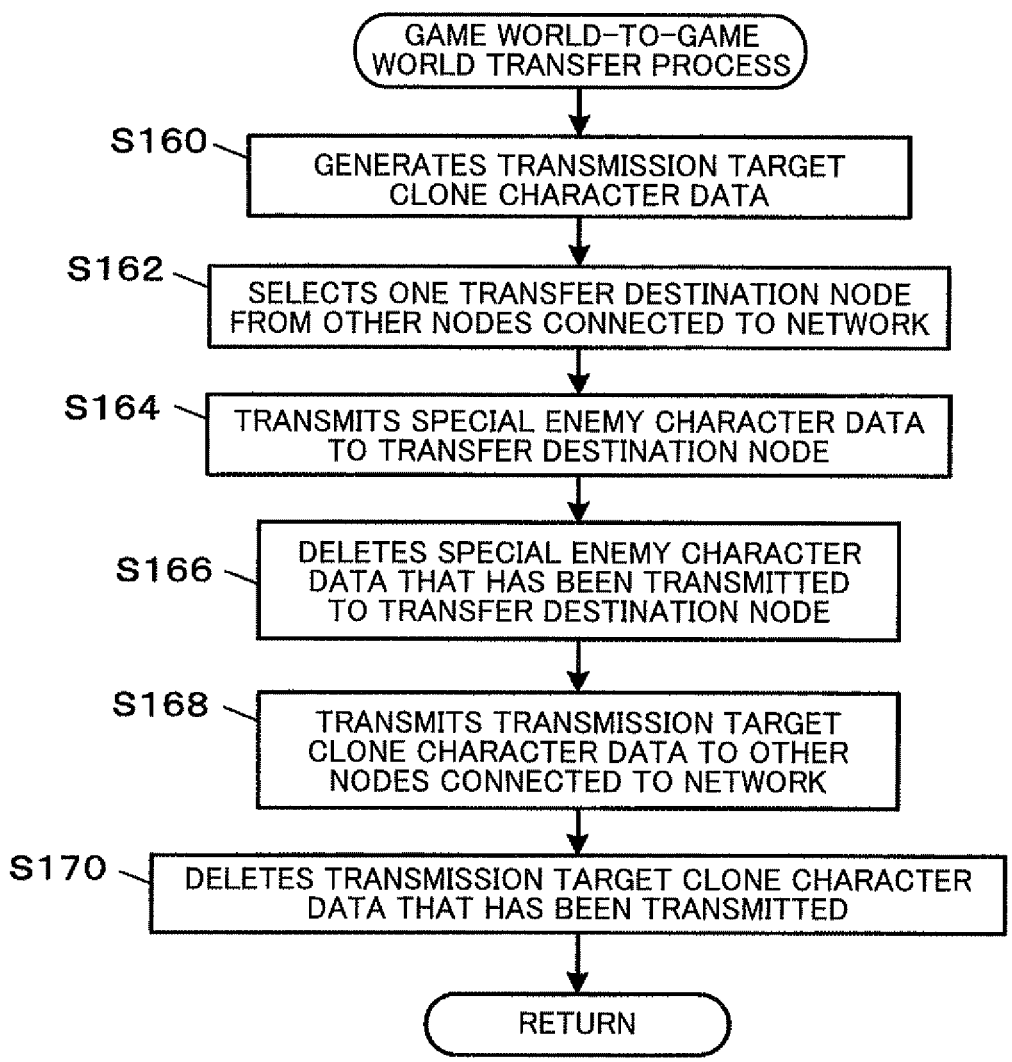
FIG. 17 is a flowchart illustrating the flow of a game world-to-game world transfer process.

FIG. 17 is a flowchart illustrating the flow of the game world-to-game world transfer process according to the first embodiment. In the game world-to-game world transfer process, the processing section 200 generates the transmission target clone character data 560 from the processing target special enemy character data 530 (step S160). Note that the clone ID 561 is uniquely set so that the dormant time 565 varies depending on the generation target data (e.g., the dormant time 565 increases as the later the data is generated).

The processing section 200 then selects one transfer destination node from the other nodes (other game devices) connected to the P2P network (step S162).

More specifically, the processing section 200 sorts the other nodes according to the game world similarity to the game status of the game device, and selects the node with the highest game world similarity. For example, the processing section 200 refers to the player character status data 526, and sorts the other nodes according to the distance (difference in position) from the player character 10 in the game world (game space), or the difference in ability parameter value from the player character 10.

The processing section 200 transmits the special enemy character data 530 subjected to the loop C process to the transfer destination node (step S164), deletes the special enemy character data 530, and deletes the special enemy character from the game world (step S166). In this case, it is preferable to cause the special enemy character to gradually disappear from the game world.

The processing section 200 then sequentially transmits the clone character data 560 generated in the step S160 to the other nodes (step S168), and appropriately deletes the transmission target clone character data 560 after transmitting the clone character data 560 (step S170). The processing section 200 then terminates the game world-to-game world transfer process.

Again referring to the flowchart illustrated in FIG. 14, the processing section 200 determines that the special enemy character has been defeated by the player character 10 when the current HP 544 of the special enemy character 7 included in the special enemy character data 530 subjected to the loop C process are "0" (YES in step S190), determines benefit given to each player who has battled against the special enemy character 7, and registers the determined benefit in the benefit-giving list 590 (step S192). More specifically, the processing section 200 refers to the battle record 550 included in the special enemy character data 530 subjected to the loop C process, sets benefit corresponding to the damage level 554, and registers the benefit information and the address information 552 in the benefit-giving list 590.

The processing section 200 then deletes the special enemy character 7 that corresponds to the special enemy character data 530 subjected to the loop C process from the game world (step S194). The processing section 200 deletes the processing target special enemy character data 530 from the storage section 500 (step S196), and terminates the loop C process (step S198).

When the loop C process has been performed on each special enemy character data 530, the processing section 200 refers to the benefit-giving list 590, and transmits the benefit-giving request signal and the benefit information to the node indicated by the address information 592 registered in the benefit-giving list 590 (step S210; see FIG. 12).

The processing section 200 deletes the registered node that has safely transmitted the benefit-giving request signal from the benefit-giving list 590 (step S212), and also deletes the registered node for which the time limit 596 has elapsed from the benefit-giving list 590 (step S214).

When the benefit-giving request signal has been received from another node (YES in step S220), the processing section 200 gives benefit to the player according to the benefit information received together with the benefit-giving request signal (step S222).

The processing section 200 then determines whether or not the game end condition has been satisfied. In the first embodiment, the processing section 200 determines that the game end condition has been satisfied when the HP of the player character 10 have reached "0". Note that another condition may be appropriately set as the game end condition.

When the processing section 200 has determined that the game end condition has not been satisfied (NO in step S240), the processing section 200 starts the process in the next control cycle from the step S10.

When the processing section 200 has determined that the game end condition has been satisfied (YES in step S240), the processing section 200 performs a game ending process such as displaying an ending screen (step S242), and terminates the process.

According to the first embodiment, it is possible to implement a special NPC (special enemy character 7) that moves from parallel world (game world) to parallel world generated (present) in each node (game device), and improve the game playability (i.e., add interest to the game).

When the special NPC (special enemy character 7) has satisfied a given condition at the transfer destination, benefit is given to each layer who was involved in the transfer. In the first embodiment that implements an RPG, the special enemy character 7 is used as the NPC, and benefit is given to each player who has damaged the special enemy character 7 when the special enemy character 7 has been defeated.

A clone is provided to another node when the NPC has moved. The clone is promoted to the original special NPC (special enemy character 7) when the original special NPC (special enemy character 7) has not moved to the node before the dormant time elapses. Therefore, the NPC that moves from node to node can be restored even if the transfer destination game device has been disconnected from the P2P network, and the special NPC (special enemy character 7) cannot move from the disconnected node (game device) to another node (another game device).

Second Embodiment

A second embodiment of the invention is described below. The second embodiment is implemented basically in the same manner as the first embodiment, but differs from the first embodiment in that the second embodiment additionally implements (1) a function of changing the nodes connected via the P2P network, (2) a function of notifying the player of the coming of the special character, and (3) a function of changing the action pattern of the special enemy character 7 when transfer has occurred. The same elements as those described above in connection with the first embodiment are indicated by identical signs, and detailed description thereof is omitted. The following description mainly focuses on the differences from the first embodiment.

Figure 18:
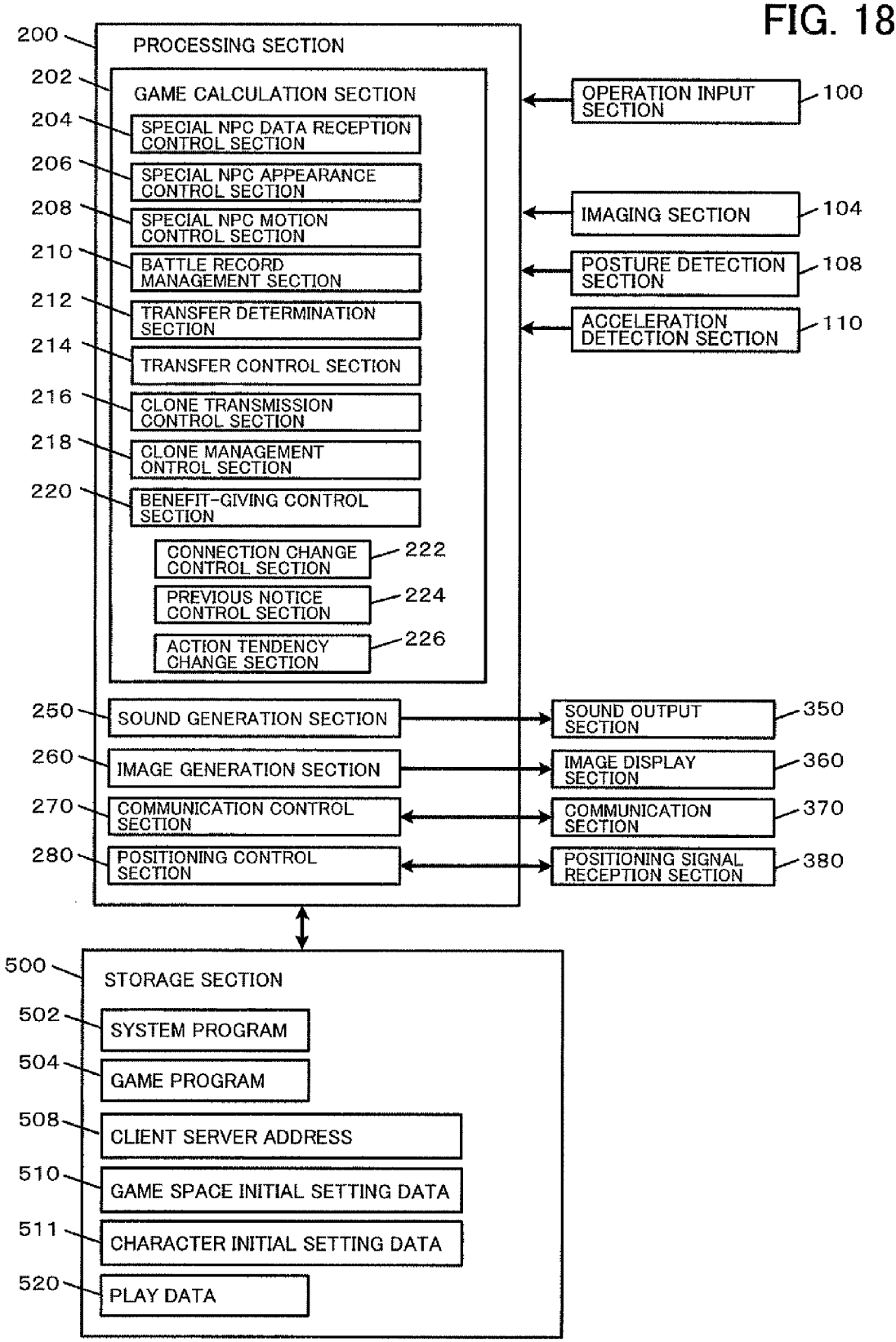
FIG. 18 is a functional block diagram illustrating a functional configuration example according to a second embodiment.

FIG. 18 is a functional block diagram illustrating a functional configuration example according to the second embodiment. In the second embodiment, the game calculation section 202 includes a connection change control section 222, a previous notice control section 224, and an action tendency change section 226.

The connection change control section 222 acquires at least part of the play data stored in an another player's node that is connected to the player's node via the P2P network, and calculates the similarity between the status of the game world generated in the player's node and the status of the game world in the other player's node. The similarity corresponds to a connection change priority.

The previous notice control section 224 notifies the player of the coming of the special enemy character 7 on condition that the clone character data 560 has been received. In the second embodiment, the clone transmission control section 216 generates the clone character data 560 at a timing at which the special enemy character data 530 has been received from another node, and transmits the clone character data 560 to another node.

The action tendency change section 226 changes the action tendency of the special character 7 that has appeared in the game world corresponding to the number of transfers. More specifically, the action tendency change section 226 adjusts the AI control pattern. In the second embodiment, the special character 7 becomes more violent as the number of transfers increases.

The flow of a process according to the second embodiment is described below. The flow of the process according to the second embodiment is basically the same as that of the first embodiment. When notifying the player of the coming of the special enemy character 7, the processing section 200 performs a clone transmission process after the step S16.

Figure 19:
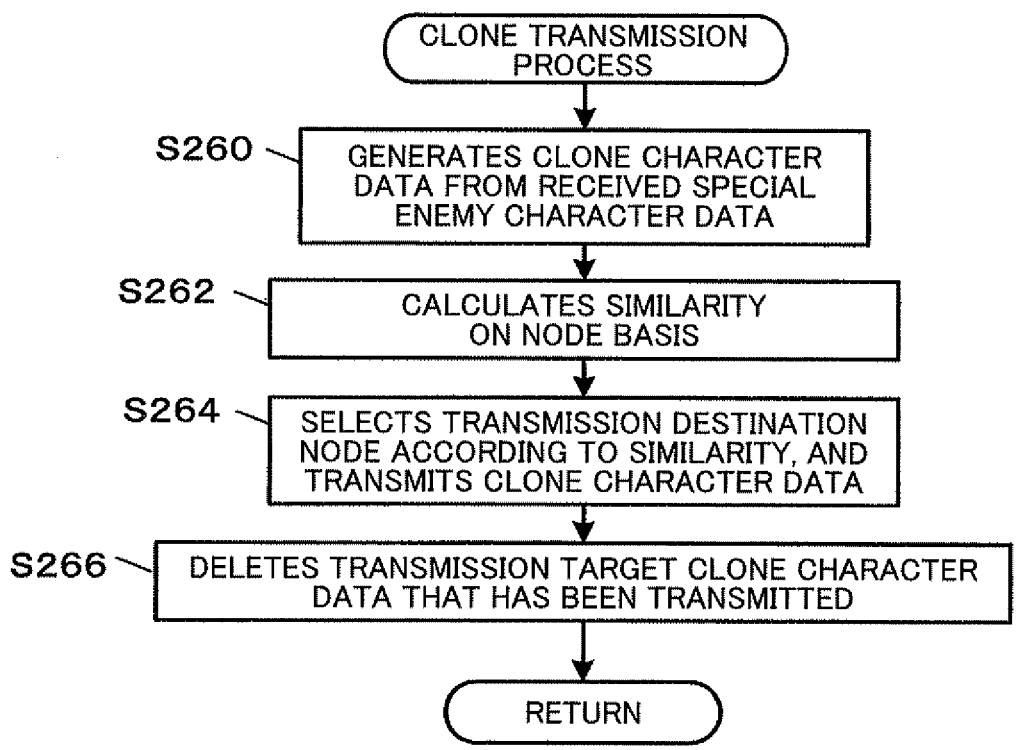
FIG. 19 is a flowchart illustrating the flow of a clone transmission process.

FIG. 19 is a flowchart illustrating the flow of the clone transmission process. In the clone transmission process, the processing section 200 generates the clone character data 560 based on the received special enemy character data 530 (step S260). The processing section 200 refers to the play data 520 stored in each node that is currently connected via the P2P network, and calculates the similarity on a node basis (step S262). The processing section 200 selects the transmission destination node according to the similarity, and transmits the clone character data 560 (step S264). The processing section 200 then deletes the clone character data 560 that has been transmitted (step S266), and terminates the clone transmission process.

Since the clone character data 560 is generated and transmitted during the clone transmission process, the steps (steps S160, S168, and S170 in FIG. 17) that relate to the clone character data 560 are omitted from the game world-to-game world transfer process.

The processing section 200 then displays a given previous notice (e.g., "We've been informed that a special character is wandering about. Make ready for battle!"). Such a previous notice allows the player to enjoy waiting for an encounter with the special enemy character 7.

When changing the action tendency, the processing section 200 performs an action tendency change process on each special enemy character 7 between the step S128 and the step S130.

Figure 20:
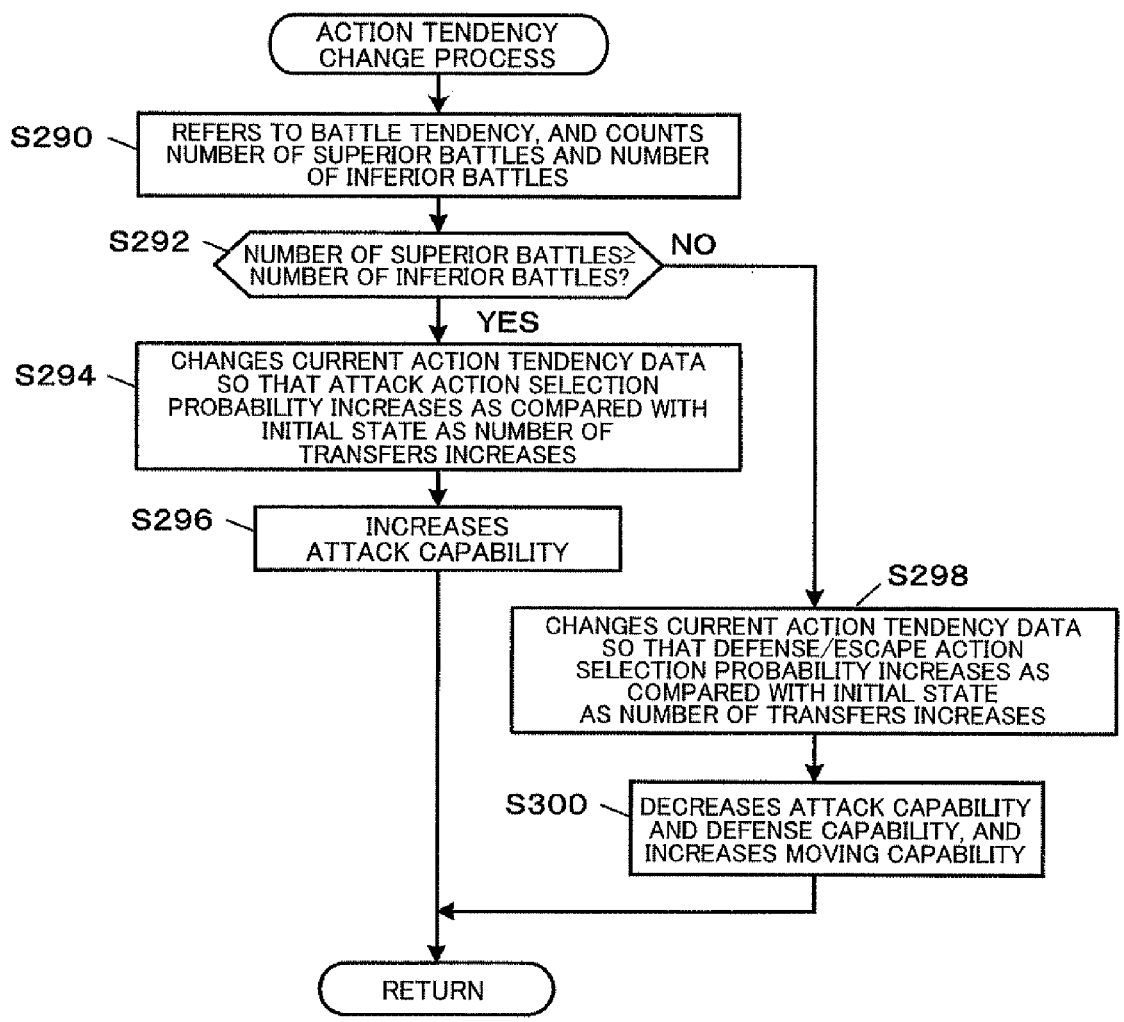
FIG. 20 is a flowchart illustrating the flow of an action tendency change process.

As illustrated in FIG. 20, the processing section 200 refers to the battle tendency 556 included in the battle record 550, and counts the number of superior battles and the number of inferior battles (step S290).

When the number of superior battles is equal to or larger than the number of inferior battles (YES in step S292), the processing section 200 changes the current action tendency data 549 included in the special enemy character data 530 (see FIG. 10) so that the attack action selection probability increases as compared with the initial state as the number of transfers increases (step S294). It is desirable to change the current action tendency data 549 so that an attack action with a higher attack capability ("special attack" in FIG. 10) is selected with higher selection probability. The processing section 200 increases the attack capability, the moving capability, and the like stored as the current ability parameter value 546 (step S296). When the number of inferior battles is larger than the number of superior battles (NO in step S292), the processing section 200 changes the current action tendency data 549 included in the special enemy character data 530 so that the defense/escape action selection probability increases as compared with the initial state as the number of transfers increases (step S298). The processing section 200 decreases the attack capability and the defense capability stored as the current ability parameter value 546, and increases the moving capability (step S300).

This makes it possible to generate a situation in which the special enemy character 7 has been wounded during a battle with the player character 10 that has encountered the special enemy character 7 during the transfer process, and has become more violent (e.g., "wounded lion"), or has become weak.

The processing section 200 performs a connection change process at an appropriate timing between the step S10 and the step S222. Specifically, the processing section 200 cyclically performs the connection change process.

Figure 21:
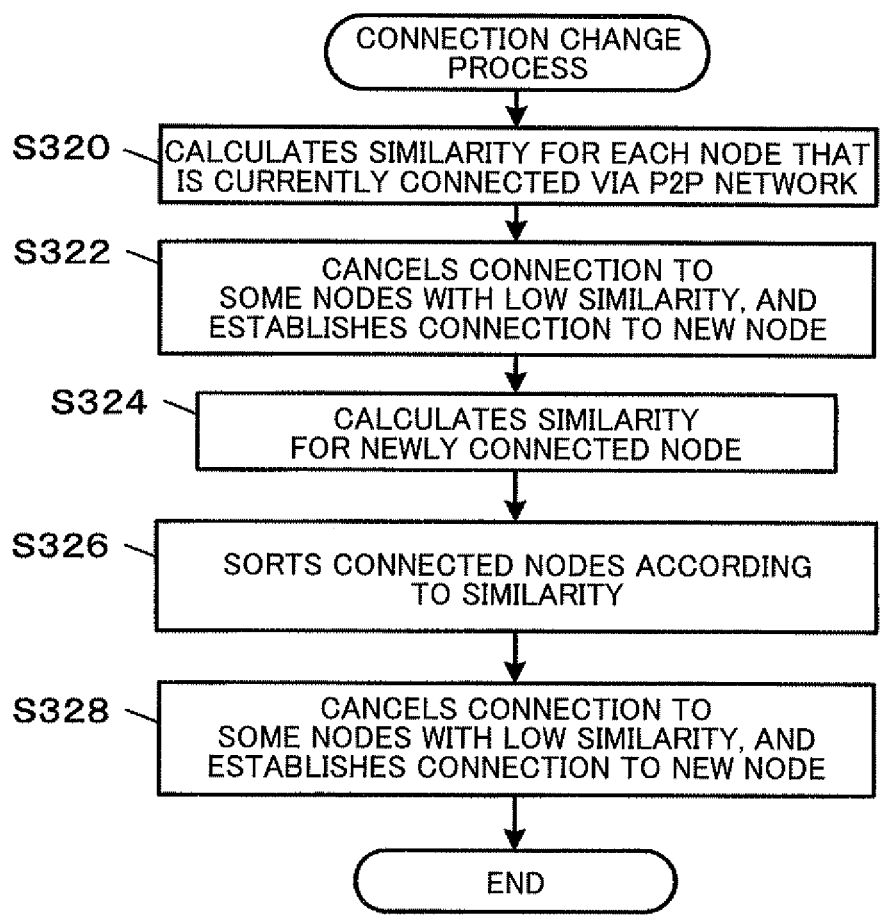
FIG. 21 is a flowchart illustrating the flow of a connection change process.

As illustrated in FIG. 21, the processing section 200 calculates the similarity for each node that is currently connected via the P2P network (step S320), cancels connection to some nodes with low similarity, and establishes connection to a new node (step S322). The processing section 200 calculates the similarity for the newly connected node (step S324), sorts the connected nodes according to the similarity (step S326), cancels connection to some nodes with low similarity based on the sorting results, and establishes connection to another new node (step S328). Note that the connection change process need not necessarily be performed between the step S10 and the step S222. For example, the connection change process may be appropriately performed at given intervals.

The connection change process makes it possible to cause the special enemy character 7 present in a game world similar to the game world generated in the player's game device to move to another game world. It is likely that the special enemy character 7 satisfies the appearance condition, and battles against the player character at the transfer destination. Therefore, it is likely that the special enemy character 7 is defeated at an relatively early stage, and benefit is given to each player who has battled against the special enemy character 7. It is possible to effectively utilize the special enemy character by notifying each player who has battled against the special enemy character that the special enemy character has been defeated, and giving benefit to each player when each player still remembers the battle with the special enemy character.

Modifications

The embodiments to which the invention is applied have been described above. Note that the invention is not limited thereto. Various modifications may be appropriately made, such as adding other elements, omitting some of the elements, or changing some of the elements.

The computer that may be used as the game device 1500 is not limited to a computer classified as a game device (including portable game device, stationary game device, and arcade game device). For example, a personal computer, a smartphone, a tablet information terminal, a mobile phone, a digital music player, a digital camera, or the like may be used as the game device 1500.

Although the above embodiments have been described taking a super-node hybrid P2P network as an example, another network may also be used as long as the network utilizes direct connection between computers. A direct connection configuration that enables SpotPass communication may be used. A configuration that enables pseudo-SpotPass communication by utilizing the GPS may also be used. For example, a position management server that manages the position of the game device 1500 of each player is provided, and each game device 1500 transmits the position information obtained by the positioning control section 280 and date information to the position management server at any time. The position management server extracts game devices 1500 that have approached each other to be positioned within a given distance within a given time, determines that the SpotPass condition has been satisfied by the extracted game devices 1500, and allows the extracted game devices 1500 to communicate with each other.

Although the above embodiments have been described taking an example in which the game is an RPG, and the special character is an enemy NPC, the special character is not limited thereto. The special character may be appropriately set depending on the game. For example, when implementing a rescue action game, the special character may be a rescue target NPC. The special character may be a lucky NPC that allows the player character to obtain a special item when the player character has encountered the lucky NPC, or may be an unlucky NPC that brings misfortune on the player character. The NPC may be a human being, an animal, a robot, a virtual life, or a special item.

Although the above embodiments have been described taking an example in which the special enemy character 7 can move from game world to game world until the HP reach "0", the number of transfers may be limited to a given value.

Figure 22:
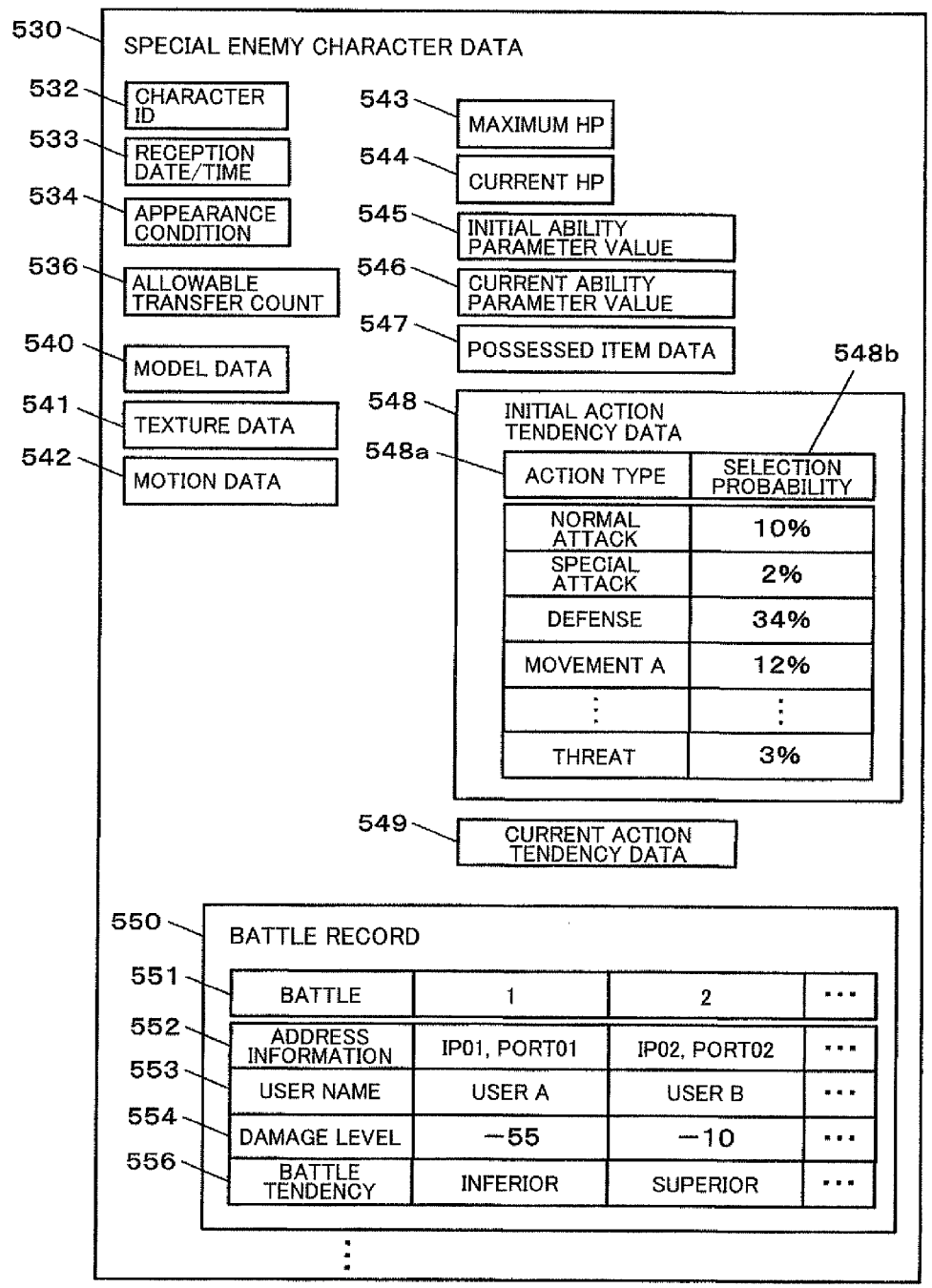
FIG. 22 is a view illustrating a data configuration example of special enemy character data.

For example, an allowable transfer count 536 is stored as the special enemy character data 530 in the first embodiment (see FIG. 22). Note that similar data is also stored as the clone character data 560. The initial value of the allowable transfer count 536 may be appropriately set. The initial value indicates the latest upper-limit number of times that the special enemy character 7 can move from game world to game world. The battle order 551 included in the battle record 550 indicates the number of transfers that have occurred.

Figure 23:
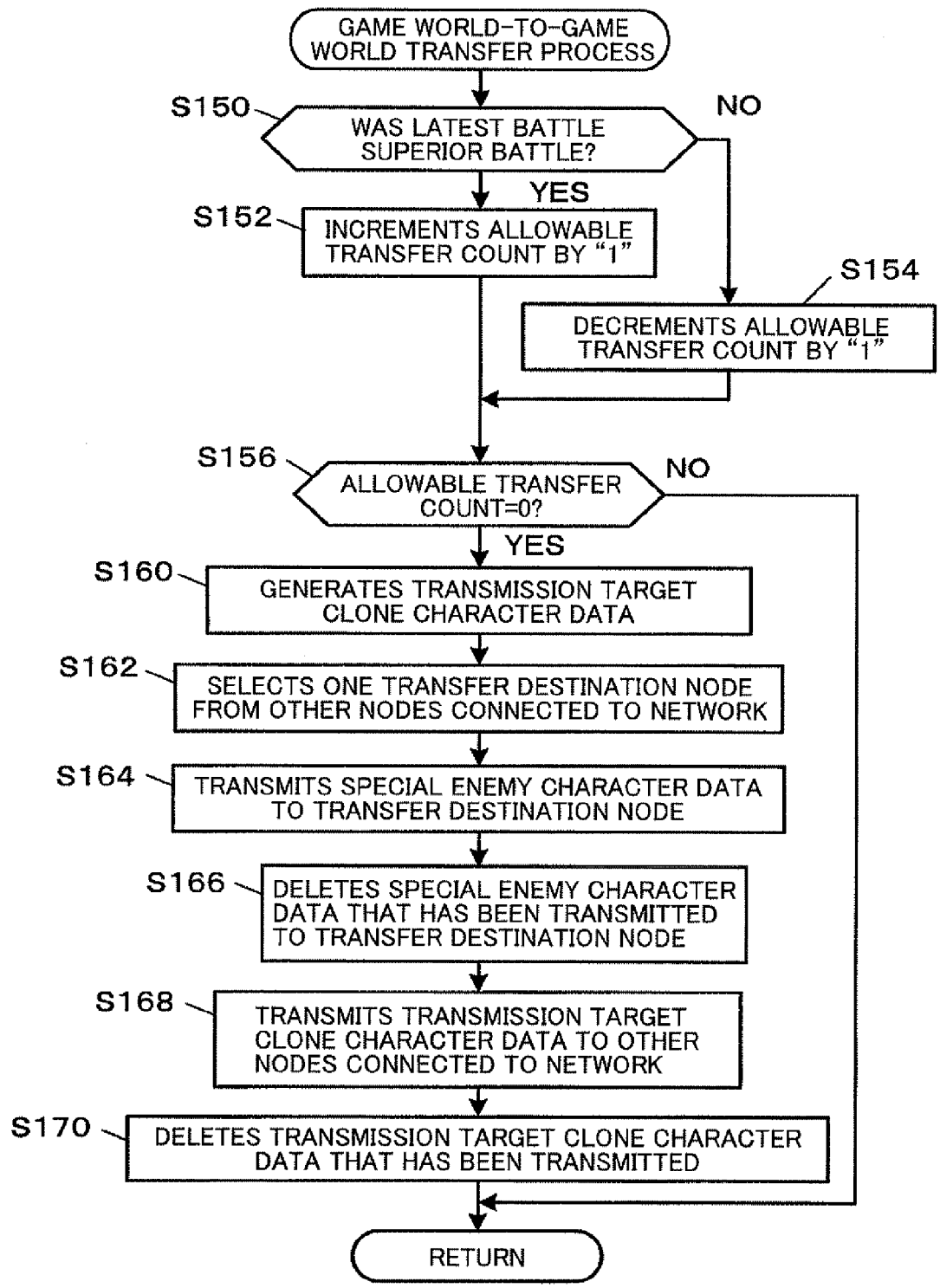
FIG. 23 is a flowchart illustrating the flow of a game world-to-game world transfer process according to a modification.

As illustrated in FIG. 23, before generating the clone character data 560 in the game world-to-game world transfer process, when the battle tendency 556 included in the battle record 550 indicates that the latest battle was a superior battle (YES in step S150), the processing section 200 increments the allowable transfer count 536 included in the special enemy character data 530 subjected to the loop C process by one (step S152). When the battle tendency 556 included in the battle record 550 indicates that the latest battle was an inferior battle or a draw (NO in step S150), the processing section 200 decrements the allowable transfer count 536 by one (step S154). Note that the minimum value of the allowable transfer count 536 is "0".

When the allowable transfer count 536 is "0" (YES in step S156), the processing section 200 terminates the game world-to-game world transfer process without transmitting the clone character data. When the allowable transfer count 536 is not "0" (NO in step S156), the processing section 200 transmits the clone character data (steps S160 to S170).

Although only some embodiments of the invention have been described in detail above, those skilled in the art would readily appreciate that many modifications are possible in the embodiments without materially departing from the novel teachings and advantages of the invention. Accordingly, such modifications are intended to be included within the scope of the invention.

What is claimed is:

1. A method comprising:
   receiving a non-playable character (NPC) data from a first different computer;
   displaying an NPC using the NPC data;
   controlling a battle with the NPC based on an operation input;
   rewriting the NPC data corresponding to the battle;
   transmitting the NPC data that has been rewritten to a second different computer; and
   determining whether or not a result of the battle has satisfied a transfer condition that is specified as a condition whereby the NPC moves, at least one of the receiving, the displaying, the controlling, and the transmitting being performed by a hardware processor, and the transmitting including transmitting the NPC data to the second different computer when the result of the battle has satisfied the transfer condition.

2. A method comprising:

receiving a non-playable character (NPC) data from a first different computer;

displaying an NPC using the NPC data;

controlling a battle with the NPC based on an operation input;

rewriting the NPC data corresponding to the battle;

transmitting the NPC data that has been rewritten to a second different computer;

causing the NPC to appear in a game world when a game status has satisfied an appearance condition that is specified as a condition whereby the NPC appears; and transmitting the NPC data received from the first different computer to the second different computer without rewriting the NPC data when a state in which the appearance condition is not satisfied has continued for a given time, at least one of the receiving, the displaying, the controlling, and the transmitting being performed by a hardware processor.

3. A method comprising:

receiving a non-playable character (NPC) data from a first different computer;

displaying an NPC using the NPC data;

controlling a battle with the NPC based on an operation input;

rewriting the NPC data corresponding to the battle;

transmitting the NPC data that has been rewritten to a second different computer; and receiving clone data of the NPC data that is linked to a time limit from a third different computer, at least one of the receiving the NPC, the displaying, the controlling, and the transmitting being performed by a hardware processor, and the displaying including causing the NPC to appear based on the clone data when the NPC data has not been received from the first different computer before the time limit linked to the clone data is reached.

4. The method as defined in claim 3, further comprising:

receiving the NPC data from the first different computer after causing the NPC to appear based on the clone data, and not displaying the NPC based on the NPC data received from the first different computer when the NPC data received from the first different computer is identical with the clone data.

5. A method comprising:

receiving a non-playable character (NPC) data from a first different computer;

displaying an NPC using the NPC data;

controlling a battle with the NPC based on an operation input;

rewriting the NPC data corresponding to the battle;

transmitting the NPC data that has been rewritten to a second different computer;

generating clone data based on the NPC data, the clone data being data of a clone character of the NPC; and transmitting the clone data that is linked to time limit information to a third different computer, at least one of the receiving, the displaying, the controlling, and the transmitting being performed by a hardware processor.

6. A method comprising:

receiving a non-playable character (NPC) data from a first different computer;

displaying an NPC using the NPC data;

controlling a battle with the NPC based on an operation input;

rewriting the NPC data corresponding to the battle; and transmitting the NPC data that has been rewritten to a second different computer, at least one of the receiving, the displaying, the controlling, and the transmitting being performed by a hardware processor, the NPC data including battle player historical information that identifies a computer of a player who has battled against the NPC, and the method further comprising performing a given benefit-giving process when a result of the battle has satisfied a given benefit-giving condition, and transmitting a signal to the computer of the player who has battled against the NPC based on the battle player historical information, the signal prompting the computer of the player who has battled against the NPC to perform the benefit-giving process.

7. A computer device comprising:

a reception control section that receives a non-playable character (NPC) data from a first different computer;

a display control section that displays an NPC using the NPC data;

a battle control section that controls a battle with the NPC based on an operation input;

a data update section that rewrites the NPC data corresponding to the battle;

a determination section that determines whether a result of the battle has satisfied a transfer condition that is specified as a condition whereby the NPC moves; and a transmission control section that transmits the NPC data that has been rewritten to a second different computer, the transmission control section transmitting the NPC data to the second different computer when the result of the battle has satisfied the transfer condition.

8. A computer device comprising:

a reception control section that receives a non-playable character (NPC) data from a first different computer;

a display control section that displays an NPC using the NPC data;

a battle control section that controls a battle with the NPC based on an operation input;

a data update section that rewrites the NPC data corresponding to the battle;

a transmission control section that transmits the NPC data that has been rewritten to a second different computer without rewriting the NPC data when a state in which the appearance condition is not satisfied has continued for a given time; and an appearance control section that causes the NPC to appear in a game world when a game status has satisfied an appearance condition that is specified as a condition whereby the NPC appears.

9. A computer device comprising:

a reception control section that receives a non-playable character (NPC) data from a first different computer and that receives clone data of the NPC data that is linked to a time limit from a third different computer;

a display control section that displays an NPC using the NPC data and that causes the NPC to appear based on the clone data when the NPC data has not been received from the first different computer before the time limit linked to the clone data is reached;
a battle control section that controls a battle with the NPC based on an operation input;
a data update section that rewrites the NPC data corresponding to the battle; and
a transmission control section that transmits the NPC data that has been rewritten to a second different computer.

10. A computer device comprising:
a reception control section that receives a non-playable character (NPC) data from a first different computer;
a display control section that displays an NPC using the NPC data;
a battle control section that controls a battle with the NPC based on an operation input;
a data update section that rewrites the NPC data corresponding to the battle;
a processing section that generates clone data based on the NPC data, the clone data being data of a clone character of the NPC; and
a transmission control section that transmits the NPC data that has been rewritten to a second different computer, the transmission control section transmitting the clone data that is linked to time limit information to a third different computer.

11. A computer device comprising:
a reception control section that receives a non-playable character (NPC) data from a first different computer;
a display control section that displays an NPC using the NPC data;
a battle control section that controls a battle with the NPC based on an operation input;
a data update section that rewrites the NPC data corresponding to the battle; and
a transmission control section that transmits the NPC data that has been rewritten to a second different computer,
the NPC data including battle player historical information that identifies a computer of a player who has battled against the NPC, and
a benefit-giving control section that processes when a result of the battle has satisfied a given benefit-giving condition, and that transmits a signal to the computer of the player who has battled against the NPC based on the battle player historical information, the signal prompting the computer of the player who has battled against the NPC to perform the benefit-giving process.

* * * * *